United States Patent
Furuya

(10) Patent No.: US 9,442,259 B2
(45) Date of Patent: Sep. 13, 2016

(54) METHOD FOR PRODUCING OPTICAL ASSEMBLY AND OPTICAL ASSEMBLY

(71) Applicant: Sumitomo Electric Industries, LTD., Osaka (JP)

(72) Inventor: Akira Furuya, Hadano (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 14/537,269

(22) Filed: Nov. 10, 2014

(65) Prior Publication Data

US 2015/0131941 A1    May 14, 2015

(30) Foreign Application Priority Data

Nov. 11, 2013    (JP) .................................. 2013-233256

(51) Int. Cl.
G02B 6/42    (2006.01)

(52) U.S. Cl.
CPC ............. G02B 6/4231 (2013.01); *G02B 6/428* (2013.01)

(58) Field of Classification Search
CPC .............................. G02B 6/4231; G02B 6/428
See application file for complete search history.

(56) References Cited

U.S. PATENT DOCUMENTS

| | | | | |
|---|---|---|---|---|
| 6,034,808 A * | 3/2000 | Isaksson | ............... | G02B 6/4277 257/701 |
| 6,934,450 B2 * | 8/2005 | Hiramatsu | ........... | G02B 6/4292 385/126 |
| 6,937,786 B2 * | 8/2005 | Lemoff | .................. | G02B 6/125 385/114 |
| 7,036,999 B2 * | 5/2006 | Schrodinger | ........ | G02B 6/4214 257/E25.032 |
| 7,103,249 B2 * | 9/2006 | Miyamae | ............. | G02B 6/4292 385/129 |
| 7,221,829 B2 * | 5/2007 | Oono | ................... | G02B 6/4201 385/52 |
| 7,239,767 B2 * | 7/2007 | Kim | ......................... | G02B 6/42 385/14 |
| 7,316,512 B2 * | 1/2008 | Shih | ..................... | G02B 6/4214 385/47 |
| 7,373,033 B2 * | 5/2008 | Lu | ........................... | G02B 6/421 257/432 |
| 8,055,105 B2 * | 11/2011 | Hodono | ............... | G02B 6/1221 385/14 |
| 2004/0114866 A1 * | 6/2004 | Hiramatsu | ........... | G02B 6/4292 385/39 |
| 2004/0184737 A1 * | 9/2004 | Oono | ................... | G02B 6/4201 385/52 |
| 2005/0025435 A1 * | 2/2005 | Miyamae | ............. | G02B 6/4292 385/88 |
| 2005/0100264 A1 * | 5/2005 | Kim | ......................... | G02B 6/42 385/14 |
| 2005/0152640 A1 * | 7/2005 | Lemoff | .................. | G02B 6/125 385/24 |
| 2005/0254745 A1 * | 11/2005 | Schrodinger | ........ | G02B 6/4214 385/14 |

(Continued)

FOREIGN PATENT DOCUMENTS

| JP | 2003207694 A | * | 7/2003 |
|---|---|---|---|
| JP | 2012-133363 | | 7/2012 |
| JP | 2012-256869 | | 12/2012 |

*Primary Examiner* — Peter Radkowski

(74) *Attorney, Agent, or Firm* — Smith, Gambrell & Russell, LLP.

(57) ABSTRACT

A method for producing an optical assembly includes the steps of forming an optical semiconductor device including a substrate, a recess and an first optical waveguide, the optical semiconductor device having a principal surface, the recess extending from the principal surface to a middle portion of the substrate; forming an optical waveguide device including a through-hole and a second optical waveguide; positioning the optical semiconductor device and the optical waveguide device so that the principal surface of the optical semiconductor device and a back surface of the optical waveguide device face each other; aligning the optical semiconductor device and the optical waveguide device by inserting a guide pin into the through-hole and the recess so that the first optical waveguide is optically coupled with the second optical waveguide; and joining the optical semiconductor device and the optical waveguide device to each other.

12 Claims, 12 Drawing Sheets

(56) References Cited

U.S. PATENT DOCUMENTS

| | | | |
|---|---|---|---|
| 2006/0023990 A1* | 2/2006 | Shih | G02B 6/4214 385/14 |
| 2007/0297713 A1* | 12/2007 | Lu | G02B 6/421 385/14 |
| 2011/0135250 A1* | 6/2011 | Hodono | G02B 6/1221 385/14 |
| 2012/0155888 A1 | 6/2012 | Ji | |
| 2012/0288971 A1 | 11/2012 | Bogaerts | |

* cited by examiner

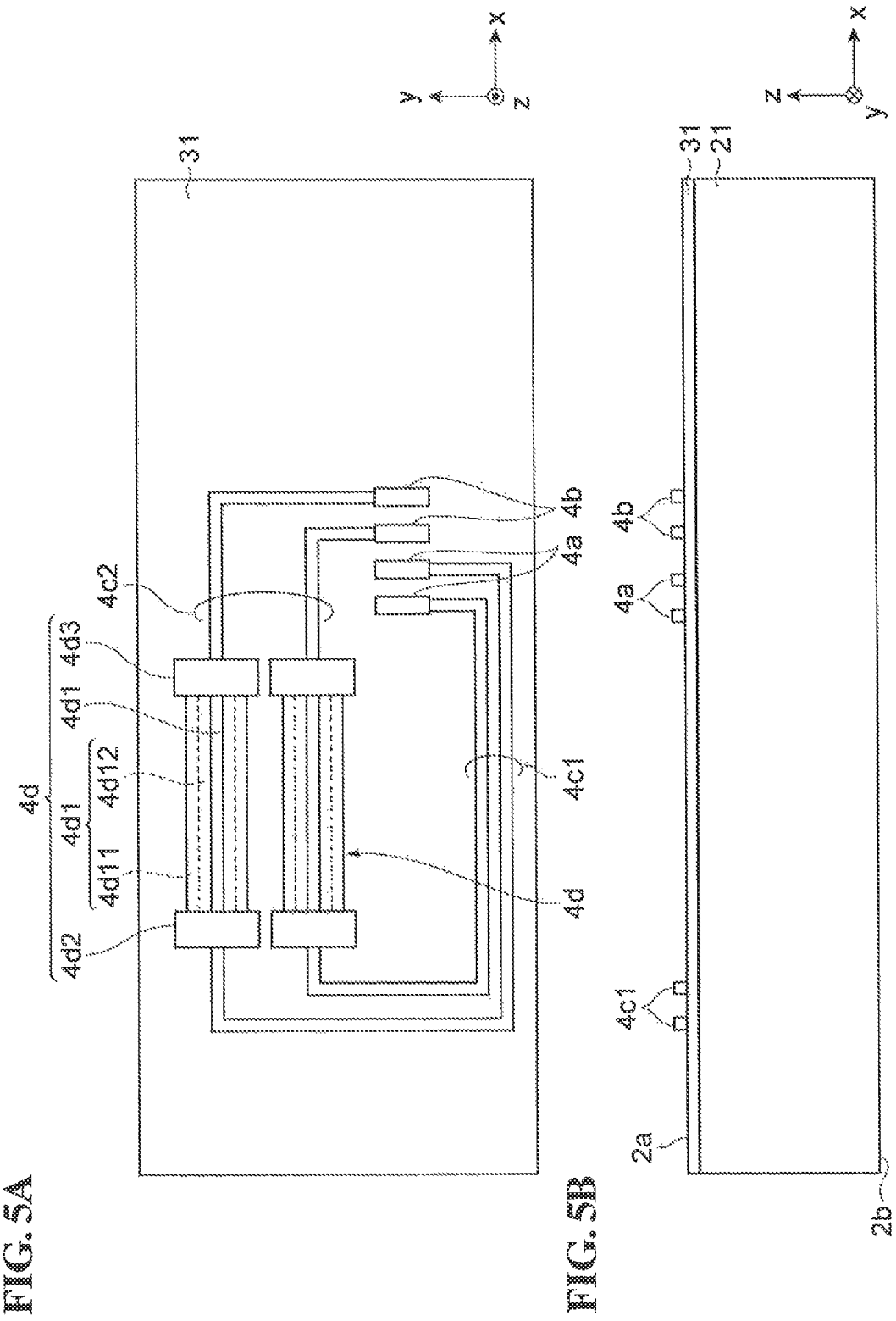

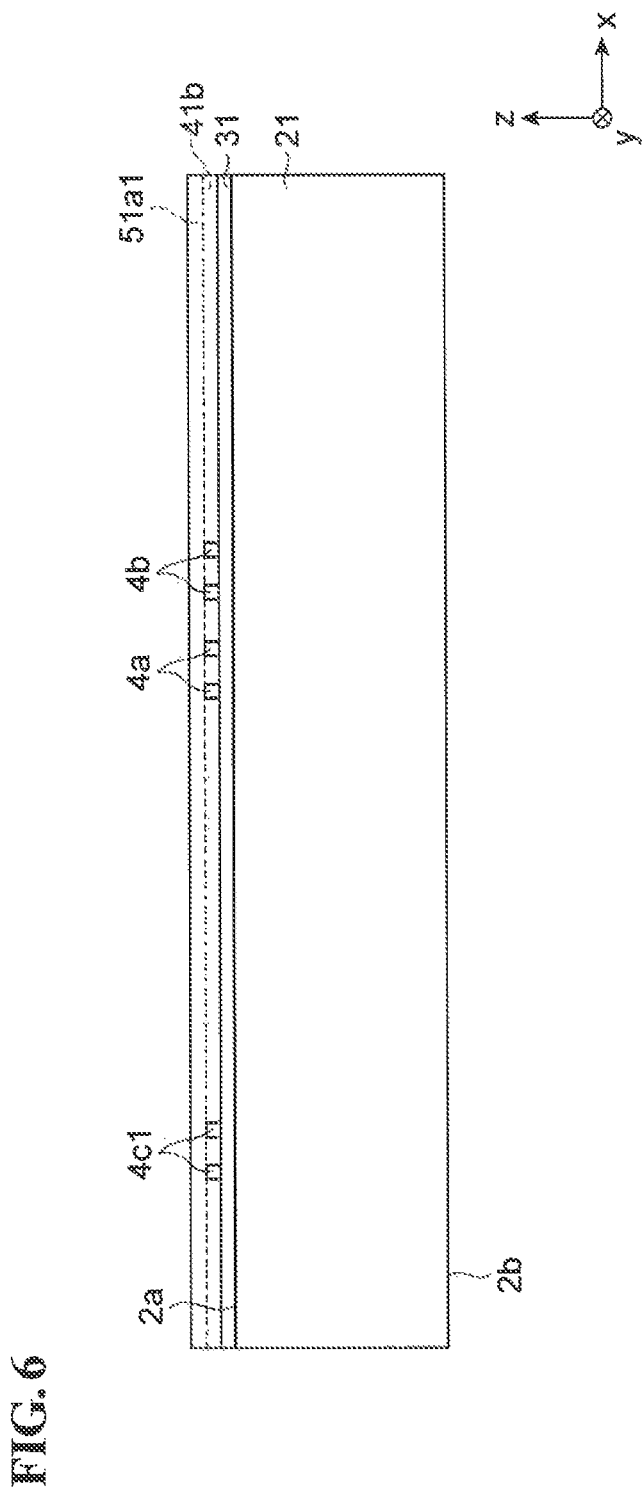

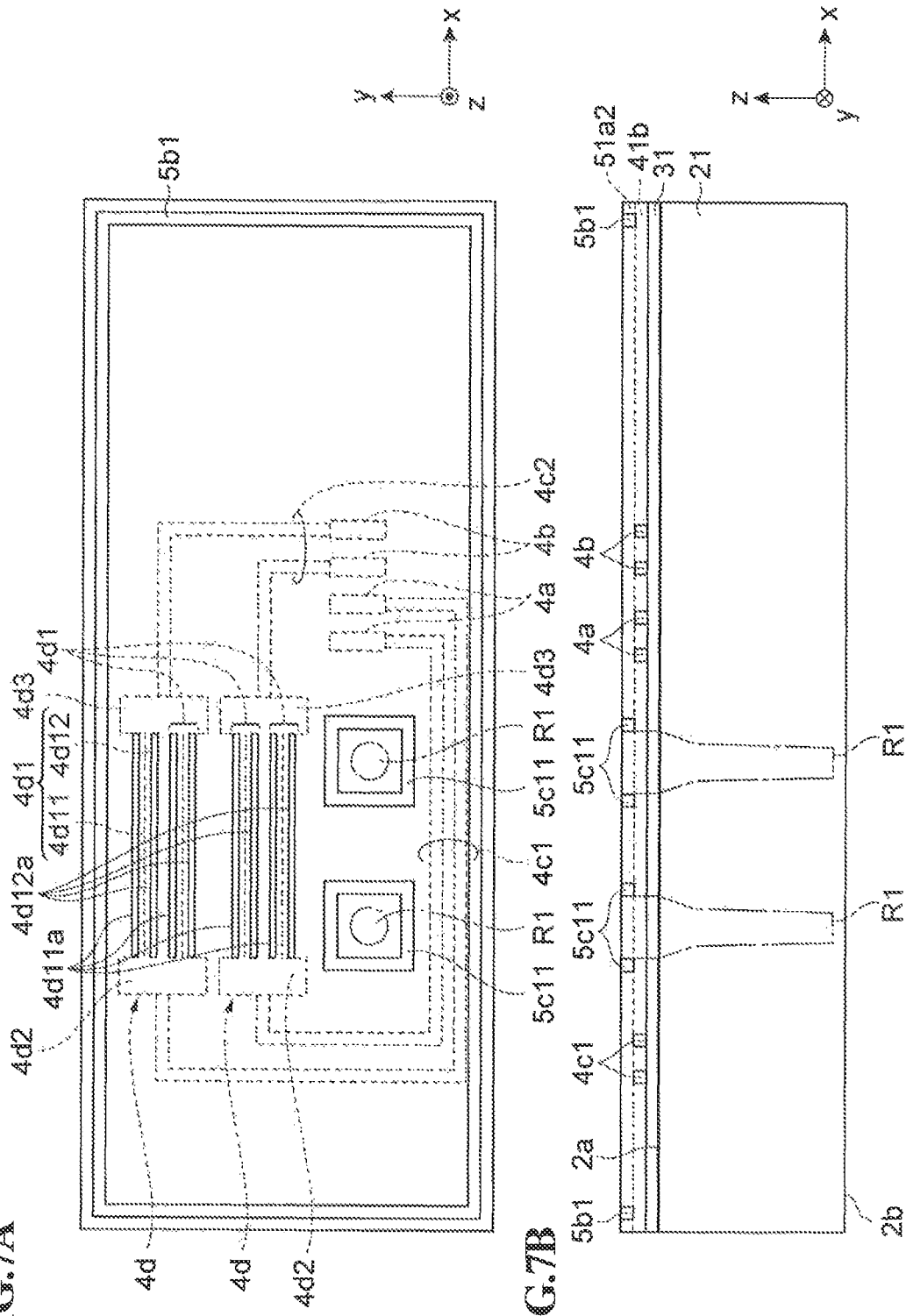

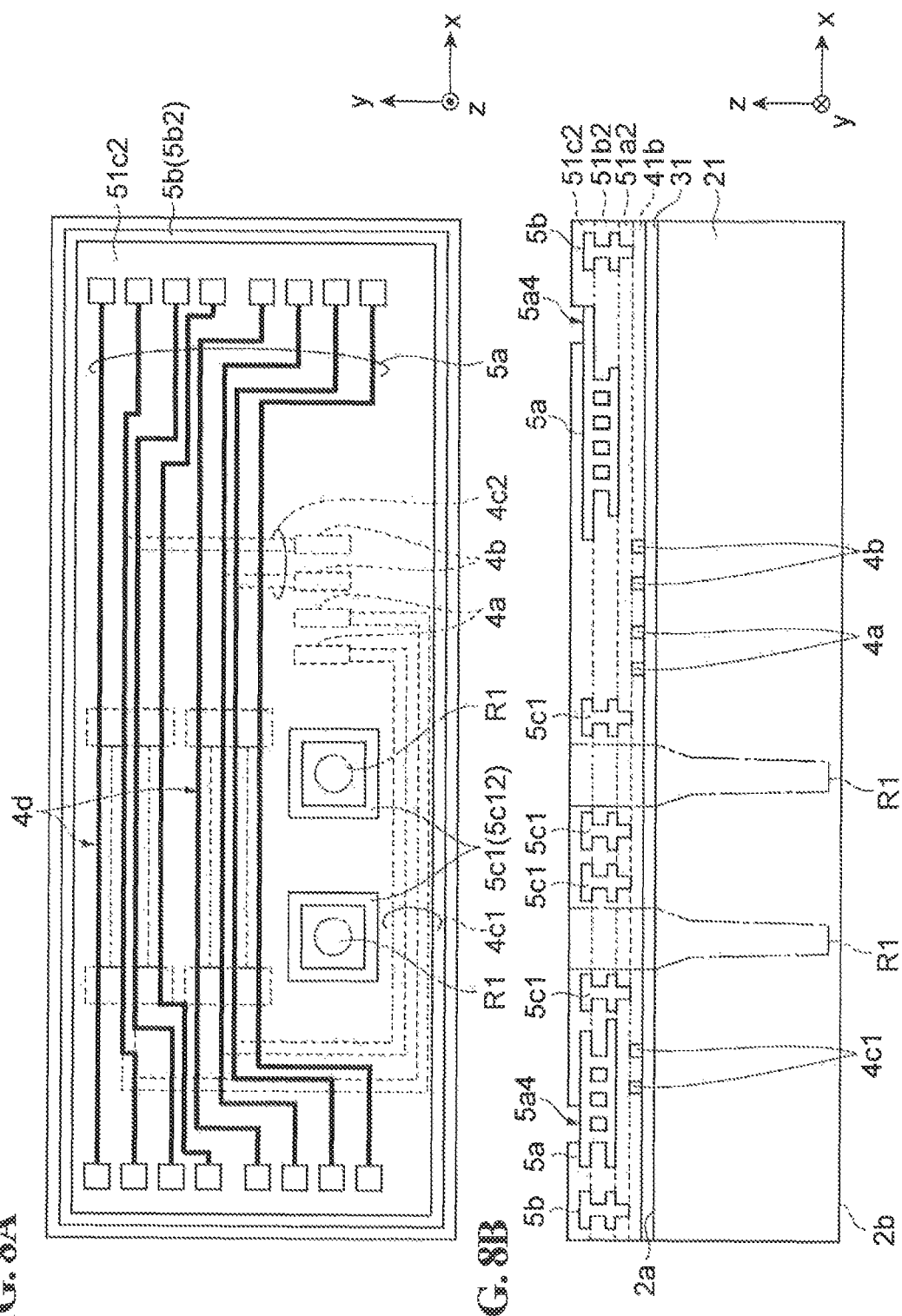

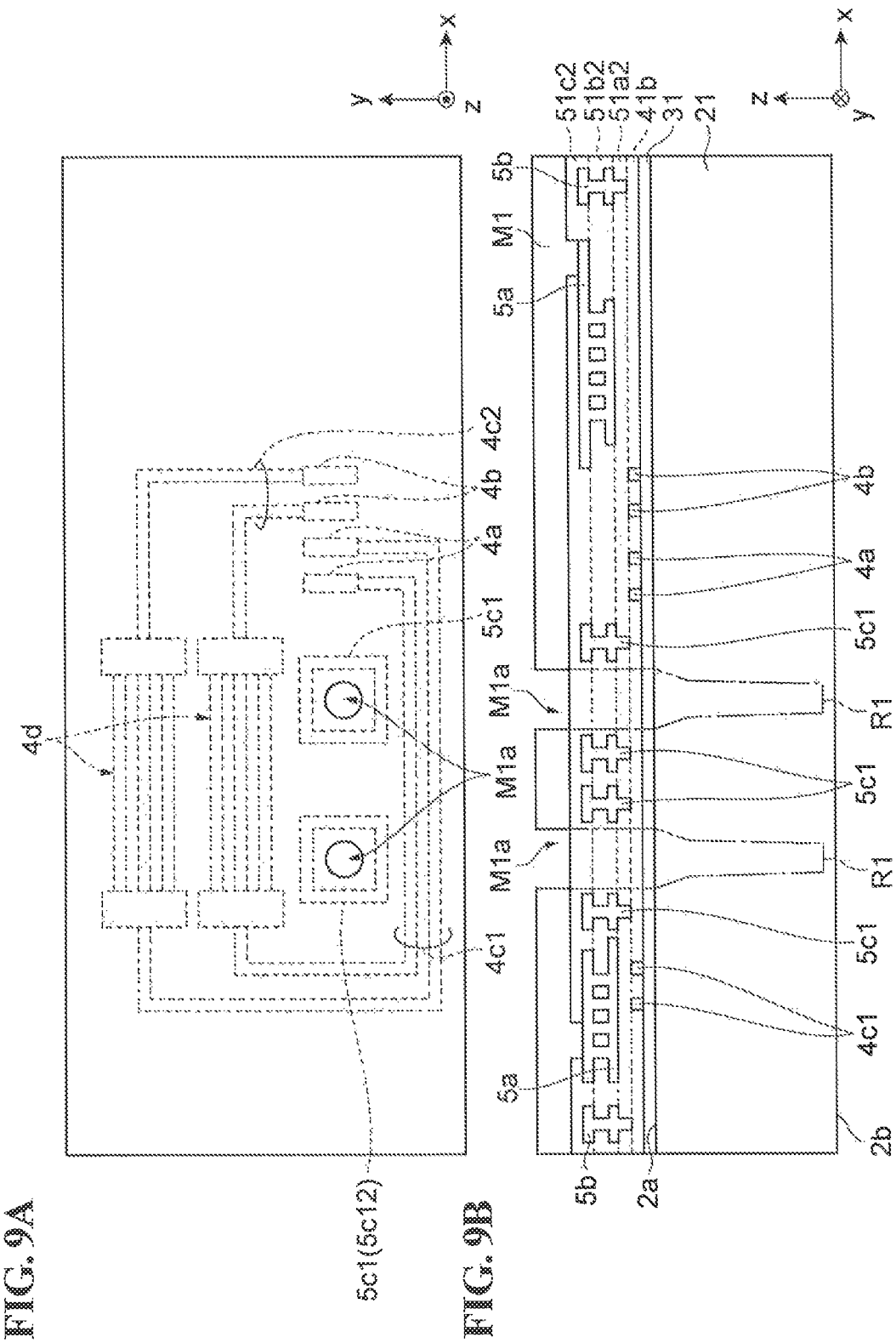

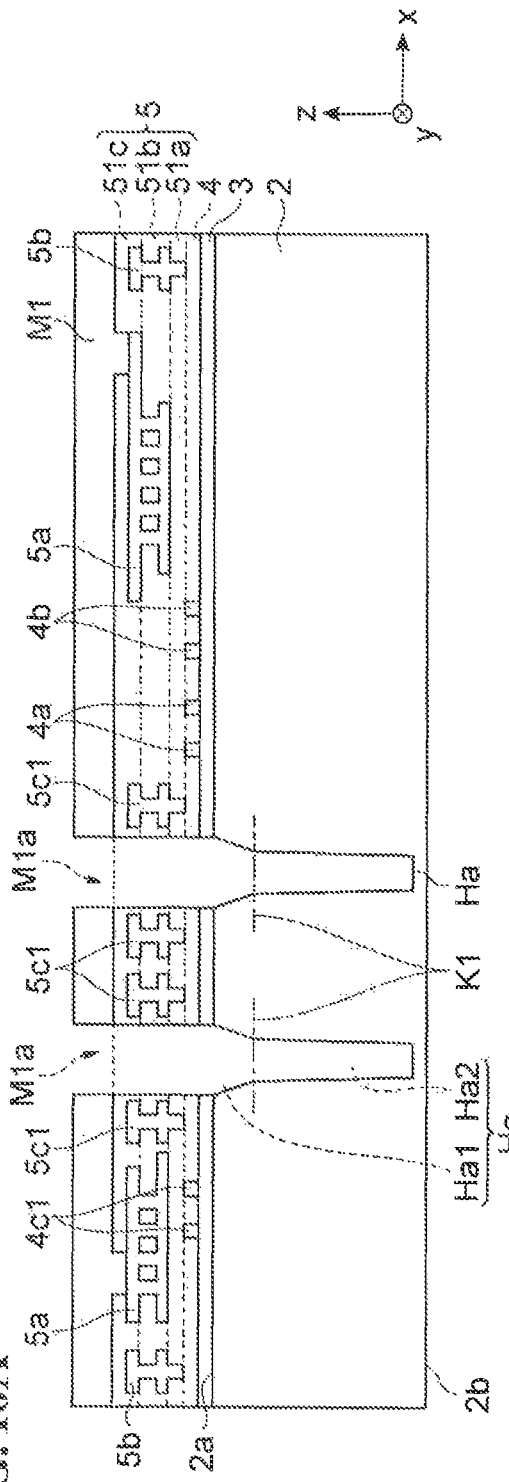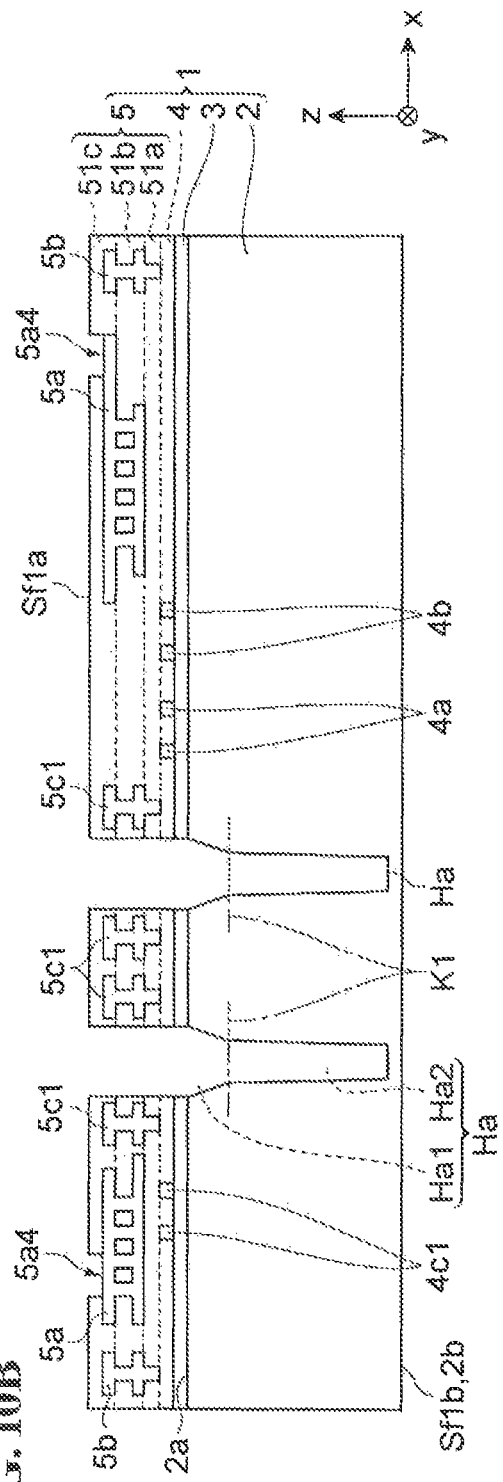

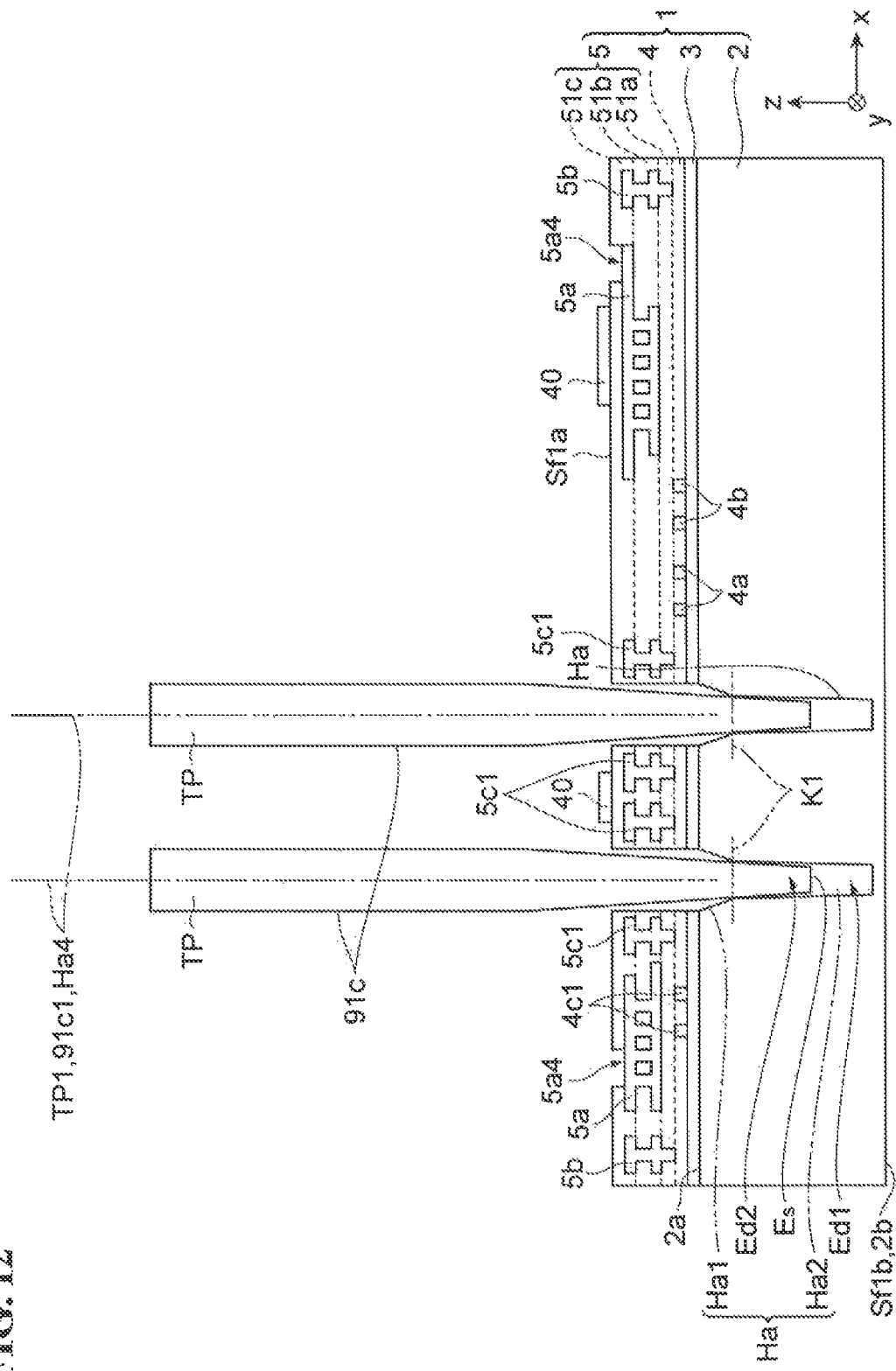

METHOD FOR PRODUCING OPTICAL ASSEMBLY AND OPTICAL ASSEMBLY

BACKGROUND OF THE INVENTION

1. Field of the Invention

The present invention relates to a method for producing an optical assembly and the optical assembly.

2. Description of the Related Art

Japanese Unexamined Patent Application Publication No. 2012-256869 (Patent Literature 1) discloses a method for integrating various photonic devices on a silicon photonics platform. This method includes the steps of providing a planarized silicon-based photonic substrate including a silicon (Si) waveguide structure, depositing a dielectric layer (such as a silicon oxide ($SiO_2$) layer) on a top portion of the planarized silicon-based photonic substrate, selectively etching the dielectric layer, thereby exposing a portion of the silicon waveguide structure, using the silicon waveguide structure as a seed layer to selectively grow in the template a germanium (Ge) layer that extends above the dielectric layer, and planarizing the germanium layer to form a planarized germanium layer having a reduced thickness of 100 nm to 500 nm.

Japanese Unexamined Patent Application Publication No. 2012-133363 (Patent Literature 2) discloses an optical modulator and an optical transmitter including the optical modulator. The optical modulator includes a light input/output unit, an optical waveguide, and a phase shifter. The light input/output unit includes a vertical grating coupler or a slanted grating coupler. The light input/output unit receives an unmodulated input light signal, divides the input light signal into a first light signal and a second light signal, and transmits the first light signal and the second light signal to a first path and a second path of the optical waveguide, respectively. The phase shifter is positioned in at least one of the first path and the second path, modulates the phase of at least one of the first light signal that is transmitted through the first path and the second light signal that is transmitted through the second path using an electrical signal, and outputs the modulated light signal as a phase modulated signal.

SUMMARY OF THE INVENTION

In recent years, an optical waveguide and an optical waveguide device such as an optical modulator are produced by processing a silicon (Si) layer on a silicon-on-insulator (SOI) substrate using a silicon complementary metal-oxide semiconductor (Si-CMOS) integrated circuit (IC) micromachining technique. Further, an optical semiconductor integrated device in which the optical waveguide and the optical waveguide device are integrated is being commercialized. For example, by processing a silicon (Si) layer on an SOI substrate, an optical waveguide, a modulator, and a grating coupler are fabricated. Further, by forming a germanium (Ge) layer and a wiring structure on the optical waveguide, the modulator, and the grating coupler, a PIN light-receiving device is formed. An optical semiconductor device in which a plurality of PIN light-receiving devices are monolithically integrated and each of wirings is connected to one of the PIN light-receiving devices is fabricated by using a conventional method such as the Si-CMOS IC micromachining technique. Optical transmitters and optical receivers are also fabricated by using this method. In such a conventional optical semiconductor device, input and output of light are optically coupled to an external optical waveguide (such as an optical fiber) at a surface of the optical semiconductor device through the grating coupler formed in the silicon (Si) layer. Therefore, the optical fiber is connected to the surface of the optical semiconductor device. It is important to produce the optical semiconductor device by applying an ordinary design rule/production process for fabricating the Si-CMOS IC so as to produce the optical semiconductor device at a low cost by using the Si-CMOS IC micromachining technique. Therefore, a device structure and a production process of the conventional optical semiconductor device become similar to those used for the CMOS IC.

In high-speed and long-distance optical transmission systems, a single-mode optical fiber is used as an optical waveguide in order to prevent deterioration of a transmission waveform caused by mode dispersion of an optical fiber. Usually, in the high-speed and long-distance optical transmission systems, near-infrared light having a wavelength of 1.3 µm to 1.6 µm is used because an optical fiber has a low optical loss in the wavelength band of 1.3 µm to 1.6 µm. In this case, the single-mode optical fiber using in the high-speed and long-distance transmission systems has a core whose diameter is about 8 µm. Therefore, in order to couple the conventional optical semiconductor device to the single-mode optical fiber with a high efficiency, a mode size of an incident light into the grating coupler or a mode size of an output light from the grating coupler is designed to be about 8 µm. In this case, the optical semiconductor device and the optical waveguide device such as a single-mode optical fiber are optically aligned with an exact precision on the order of less than or equal to ±2 µm with respect to the position of an optimal point. Hitherto, the optical alignment between the optical semiconductor device and the optical waveguide device (single-mode optical fiber) is performed by what is called an active alignment method. That is, in the active alignment method, first, the position of the optical semiconductor device and the position of the optical waveguide device are adjusted with respect to each other while light is, actually, output to the optical semiconductor device from the optical waveguide device or to the optical waveguide device from the optical semiconductor device. Next, a point where optical coupling between the optical semiconductor device and the optical waveguide device becomes a maximum is determined while adjusting the position of the optical semiconductor device and the position of the optical waveguide device with respect to each other. By using resin, solder, or the like, the optical semiconductor device and the optical waveguide device are secured at the point where the optical coupling becomes a maximum. However, in the active alignment method, it takes effort and time to align the optical semiconductor device and the optical waveguide device with respect to each other.

A method for producing an optical assembly according to the present invention includes the steps of forming an optical semiconductor device having a first principal surface and a first back surface opposite to the first principal surface, the optical semiconductor device including a substrate, a recess formed on the first principal surface, and an first optical waveguide formed on the substrate, the recess having a first center axis substantially orthogonal to the first principal surface; forming an optical waveguide device having a second principal surface and a second back surface opposite to the second principal surface, the optical waveguide device including a through-hole having a second center axis substantially orthogonal to the second back surface, and a second optical waveguide, the through-hole penetrating through the second principal surface and the second back surface; positioning the optical semiconductor device and the optical waveguide device so that the first principal surface and the second back surface face each other; aligning the optical semiconductor device and the optical waveguide device by inserting a guide pin into the through-hole and the recess, the first center axis of the recess and the second center axis of the through-hole being aligned with each other; and joining the optical semiconductor device and the optical waveguide device to each other. The recess is extended from the first principal surface to a middle portion of the substrate. In addition, in the step of aligning the optical semiconductor device and the optical waveguide device, the first optical waveguide of the optical semiconductor device is optically coupled with the second optical waveguide of the optical waveguide device.

BRIEF DESCRIPTION OF THE DRAWINGS

FIG. 2 shows a cross section of the optical semiconductor device as seen from a plane along line I-I in FIG. 1 (z-x plane).

FIG. 3 primarily shows a moisture-proof structure of the optical semiconductor device according to the embodiment as seen from the z-x plane that is the same as the plane from which FIG. 2 is seen.

FIG. 4A shows a product as seen from the x-y plane that is the same as the plane from which FIG. 1 is seen. FIG. 4B shows the product shown in FIG. 4A as seen from the z-x plane that is the same as the plane from which FIG. 2 is seen.

FIGS. 5A and 5B show a main step of the method for producing the optical semiconductor device according to the embodiment. FIG. 5A shows a product as seen from the x-y plane. FIG. 5B shows the product shown in FIG. 5A as seen from the z-x plane.

FIG. 6 shows a main step of the method for producing the optical semiconductor device according to the embodiment. FIG. 6 shows a product as seen from the z-x plane.

FIGS. 7A and 7B show a main step of the method for producing the optical semiconductor device according to the embodiment. FIG. 7A shows a product as seen from the x-y plane. FIG. 7B shows the product shown in FIG. 7A as seen from the z-x plane.

FIGS. 8A and 8B show a main step of the method for producing the optical semiconductor device according to the embodiment. FIG. 8A shows a product as seen from the x-y plane. FIG. 8B shows the product shown in FIG. 8A as seen from the z-x plane.

FIGS. 9A and 9B show a main step of the method for producing the optical semiconductor device according to the embodiment. FIG. 9A shows a product as seen from the x-y plane. FIG. 9B shows the product shown in FIG. 9A as seen from the z-x plane.

FIGS. 10A and 10B show a main step of the method for producing the optical semiconductor device according to the embodiment, and show a product as seen from the z-x plane.

FIG. 12 shows a main step of the method for producing the optical semiconductor device according to another embodiment, and shows a product as seen from the z-x plane.

DESCRIPTION OF THE PREFERRED EMBODIMENTS

Description of Embodiments of Invention

Figure 1:
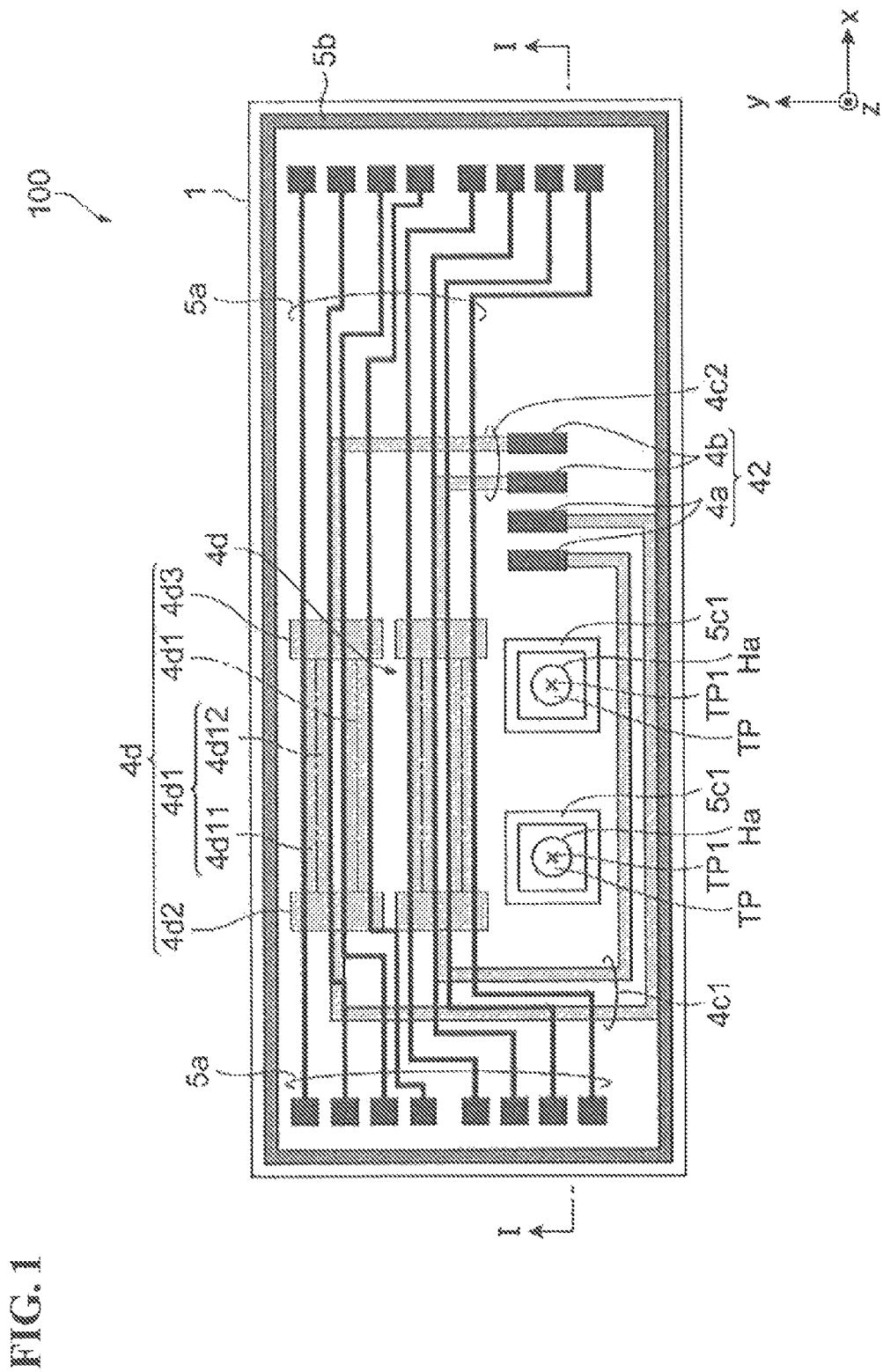
FIG. 1 shows a main internal structure of an optical semiconductor device according to an embodiment as seen from an x-y plane.

First, some embodiments according to the present invention will be described. A method for producing an optical assembly according to a first aspect of the present invention includes the steps of forming an optical semiconductor device having a first principal surface and a first back surface opposite to the first principal surface, the optical semiconductor device including a substrate, a recess formed on the first principal surface, and an first optical waveguide formed on the substrate, the recess having a first center axis substantially orthogonal to the first principal surface; forming an optical waveguide device having a second principal surface and a second back surface opposite to the second principal surface, the optical waveguide device including a through-hole having a second center axis substantially orthogonal to the second back surface, and a second optical waveguide, the through-hole penetrating through the second principal surface and the second back surface; positioning the optical semiconductor device and the optical waveguide device so that the first principal surface and the second back surface face each other; aligning the optical semiconductor device and the optical waveguide device by inserting a guide pin into the through-hole and the recess, the first center axis of the recess and the second center axis of the through-hole being aligned with each other; and joining the optical semiconductor device and the optical waveguide device to each other. The recess is extended from the first principal surface to a middle portion of the substrate. In addition, in the step of aligning the optical semiconductor device and the optical waveguide device, the first optical waveguide of the optical semiconductor device is optically coupled with the second optical waveguide of the optical waveguide device.

In the method for producing an optical assembly, the first optical waveguide of the optical semiconductor device and the second optical waveguide of the optical waveguide device are easily and precisely aligned with each other by inserting the guide pin into the through-hole of the optical waveguide device and the recess of the optical semiconductor device. Accordingly, the first optical waveguide of the optical semiconductor device is optically coupled with the second optical waveguide of the optical waveguide device with high efficiency. Therefore, in order to optically couple the first optical waveguide of the optical semiconductor device and the second optical waveguide of the optical waveguide device with each other, a process of precisely aligning the positions of the optical semiconductor device and the optical waveguide device is not required. By inserting the guide pin into the through-hole of the optical waveguide device and the recess of the optical semiconductor device, the optical semiconductor device and the optical waveguide device are quickly aligned with each other.

In the method for producing an optical assembly according to the invention, preferably, the recess includes a first region and a second region arranged adjacent to the first region. The first region has an opening at the first principal surface and a taper portion whose diameter increases from a boundary surface between the first region and the second region towards the first principal surface, the boundary surface being disposed in the substrate. The second region has a first end portion of the recess in the substrate and a taper portion whose diameter decreases from the boundary surface towards the first end portion. The guide pin includes a second end portion that has an end surface and a taper portion whose diameter decreases towards the end surface. The taper portion of the first region has a taper ratio greater than a taper ratio of the taper portion of the second end portion. In addition, the taper ratio of the taper portion of the second end portion is greater than a taper ratio of the taper portion of the second region. Furthermore, in the step of aligning the optical semiconductor device and the optical waveguide device by inserting the guide pin into the through-hole and the recess, the guide pin may be in contact with the through-hole, and the second end portion of the guide pin may be in contact with the recess at the boundary surface.

By inserting the tapered-shape end portion (second end portion) of the guide pin into the recess of the optical semiconductor device, the guide pin may be in contact with a side wall of the recess, uniformly and closely. Therefore, even if diameter dimension of the recess varies, it is possible to align the center axis of the recess and the center axis of the guide pin with a relatively high precision. Specifically, the guide pin is in contact with the recess at the boundary surface between the first region and the second region. In addition, the boundary surface is formed in the substrate. Therefore, the guide pin is inserted into the recess so as to be in contact with the side wall of the recess in the substrate which has a relatively high rigidity. Consequently, cracking caused by the contact of the guide pin and the side wall of the recess with each other may be suppressed. Occurrence of crystal defect caused by the cracking may be also suppressed. In addition, even if the cracking occurs in the substrate by the contact between the guide pin and the side wall of the recess, the cracking in the substrate does not increase because the substrate has a relatively high rigidity.

In the method for producing an optical assembly according to the invention, the optical semiconductor device may further include an electric wiring structure formed on the substrate. The electric wiring structure may include an electric wiring section and a moisture-proof structure. In addition, the moisture-proof structure may be formed between the electric wiring section and the recess so as to surround the recess.

The moisture-proof structure is provided between the electric wiring section and the recess and surrounds the recess. Therefore, the moisture-proof structure intercepts moisture that enters into the optical semiconductor device from a side surface of the recess. Therefore, with the moisture-proof structure, oxidation corrosion of the electric wiring section in the electric wiring structure is prevented.

In the method for producing an optical assembly according to the invention, preferably, the moisture-proof structure includes a metallic layer that is the same as that of the electric wiring section.

In the method for producing an optical assembly according to the invention, preferably, the optical semiconductor device includes a plurality of recesses. The optical waveguide device includes a plurality of through-holes. In addition, the optical semiconductor device and the optical waveguide device are aligned by inserting each of the guide pins into one of through-holes and one of the recesses.

In the method for producing an optical assembly according to the invention, preferably, the optical semiconductor device and the optical waveguide device are joined to each other using resin or solder while the guide pin is inserted in the through-hole and the recess.

A method for producing an optical assembly according to a second aspect of the present invention includes the steps of forming an optical semiconductor device having a first principal surface and a first back surface opposite to the first principal surface, the optical semiconductor device including a substrate, a recess formed on the first principal surface, and an first optical waveguide formed on the substrate, the recess having a first center axis substantially orthogonal to the first principal surface; forming an optical waveguide device having a second principal surface and a second back surface opposite to the second principal surface, the optical waveguide device including a through-hole having a second center axis substantially orthogonal to the second back surface, and a second optical waveguide, the through-hole penetrating through the second principal surface and the second back surface; inserting a guide pin into the recess of the optical semiconductor device; positioning the optical semiconductor device and the optical waveguide device so that the first principal surface and the second back surface face each other by sliding the optical waveguide device while the guide pin is fitted into the through-hole of the optical waveguide device, the first center axis of the recess and the second center axis of the through-hole being aligned with each other; and joining the optical semiconductor device and the optical waveguide device to each other. The recess is extended from the first principal surface to a middle portion of the substrate. In addition, in the step of positioning the optical semiconductor device and the optical waveguide device, the first optical waveguide of the optical semiconductor device is optically coupled with the second optical waveguide of the optical waveguide device.

In the method for producing an optical assembly, the first optical waveguide of the optical semiconductor device and the second optical waveguide of the optical waveguide device are easily and precisely aligned with each other by using the guide pins. Accordingly, the first optical waveguide of the optical semiconductor device is optically coupled with the second optical waveguide of the optical waveguide device with high efficiency. In the method, first, the guide pin is inserted into the recess of the optical semiconductor device. Thereafter, the optical waveguide device is slid while the guide pin is fitted into the through-hole of the optical waveguide device. Therefore, before inserting the guide pin into the through-hole and the recess, the step of positioning the optical semiconductor device and the optical waveguide device so as to roughly align the center axis of the recess and the center axis of the through-hole with each other may be omitted.

An optical assembly according to a third aspect of the present invention includes an optical semiconductor device including a substrate, a recess formed on a principal surface thereof, and an first optical waveguide formed on the substrate, the recess having a first center axis substantially orthogonal to the principal surface and extending from the principal surface to a middle portion of the substrate; an optical waveguide device provided on the principal surface of the optical semiconductor device, the optical waveguide device including a through-hole having a second center axis substantially orthogonal to the principal surface and a second optical waveguide, the through-hole penetrating through the optical waveguide device in a direction substantially orthogonal to the principal surface; and a guide pin inserting into the recess and the through-hole, the guide pin having a third center axis substantially orthogonal to the principal surface. The first center axis of the recess is aligned with the second center axis of the through-hole. The third center axis of the guide pin is aligned with the first center axis and the second center axis. In addition, the first optical waveguide of the optical semiconductor device and the second optical waveguide of the optical waveguide device are optically coupled with each other.

According to the optical assembly, the first optical waveguide of the optical semiconductor device and the second optical waveguide of the optical waveguide device are easily and precisely aligned with each other by inserting the guide pin into the through-hole of the optical waveguide device and the recess of the optical semiconductor device. Accordingly, the first optical waveguide of the optical semiconductor device is optically coupled with the second optical waveguide of the optical waveguide device with high efficiency.

In the optical assembly according to the invention, preferably, the recess includes a first region and a second region arranged adjacent to the first region. The first region has an opening at the principal surface and a taper portion whose diameter increases from a boundary surface between the first region and the second region towards the principal surface, the boundary surface being disposed in the substrate. The second region has a first end portion of the recess in the substrate and a taper portion whose diameter decreases from the boundary surface towards the first end portion. The guide pin includes a second end portion that has an end surface and a taper portion whose diameter decreases towards the end surface. The taper portion of the first region has a taper ratio greater than a taper ratio of the taper portion of the second end portion. In addition, the taper ratio of the taper portion of the second end portion is greater than a taper ratio of the taper portion of the second region. Furthermore, the guide pin may be in contact with the through-hole, and the second end portion of the guide pin may be in contact with the recess at the boundary surface.

By inserting the tapered-shape end portion (second end portion) of the guide pin into the recess of the optical semiconductor device, the guide pin may be in contact with a side wall of the recess, uniformly and closely. Therefore, even if diameter dimension of the recess varies, it is possible to align the center axis of the recess and the center axis of the guide pin with a relatively high precision. Specifically, the guide pin is in contact with the recess at the boundary surface between the first region and the second region. In addition, the boundary surface is formed in the substrate. Therefore, the guide pin is inserted into the recess so as to be in contact with the side wall of the recess in the substrate which has a relatively high rigidity. Consequently, cracking caused by the contact of the guide pin and the side wall of the recess with each other may be suppressed. Occurrence of crystal defect caused by the cracking may be also suppressed. In addition, even if the cracking occurs in the substrate by the contact between the guide pin and the side wall of the recess, the cracking in the substrate does not increase because the substrate has a relatively high rigidity.

In the optical assembly according to the invention, preferably, the optical semiconductor device further includes an electric wiring structure formed on the substrate. The electric wiring structure includes an electric wiring section and a moisture-proof structure. In addition, the moisture-proof structure is formed between the electric wiring section and the recess so as to surround the recess.

The moisture-proof structure is provided between the electric wiring section and the recess and surrounds the recess. Therefore, the moisture-proof structure intercepts moisture that enters into the optical semiconductor device from a side surface of the recess. Therefore, with the moisture-proof structure, oxidation corrosion of the electric wiring section in the electric wiring structure is prevented.

In the optical assembly according to the invention, preferably, the moisture-proof structure includes a metallic layer that is the same as that of the electric wiring section.

Detail of Embodiments of the Invention

Figure 2:
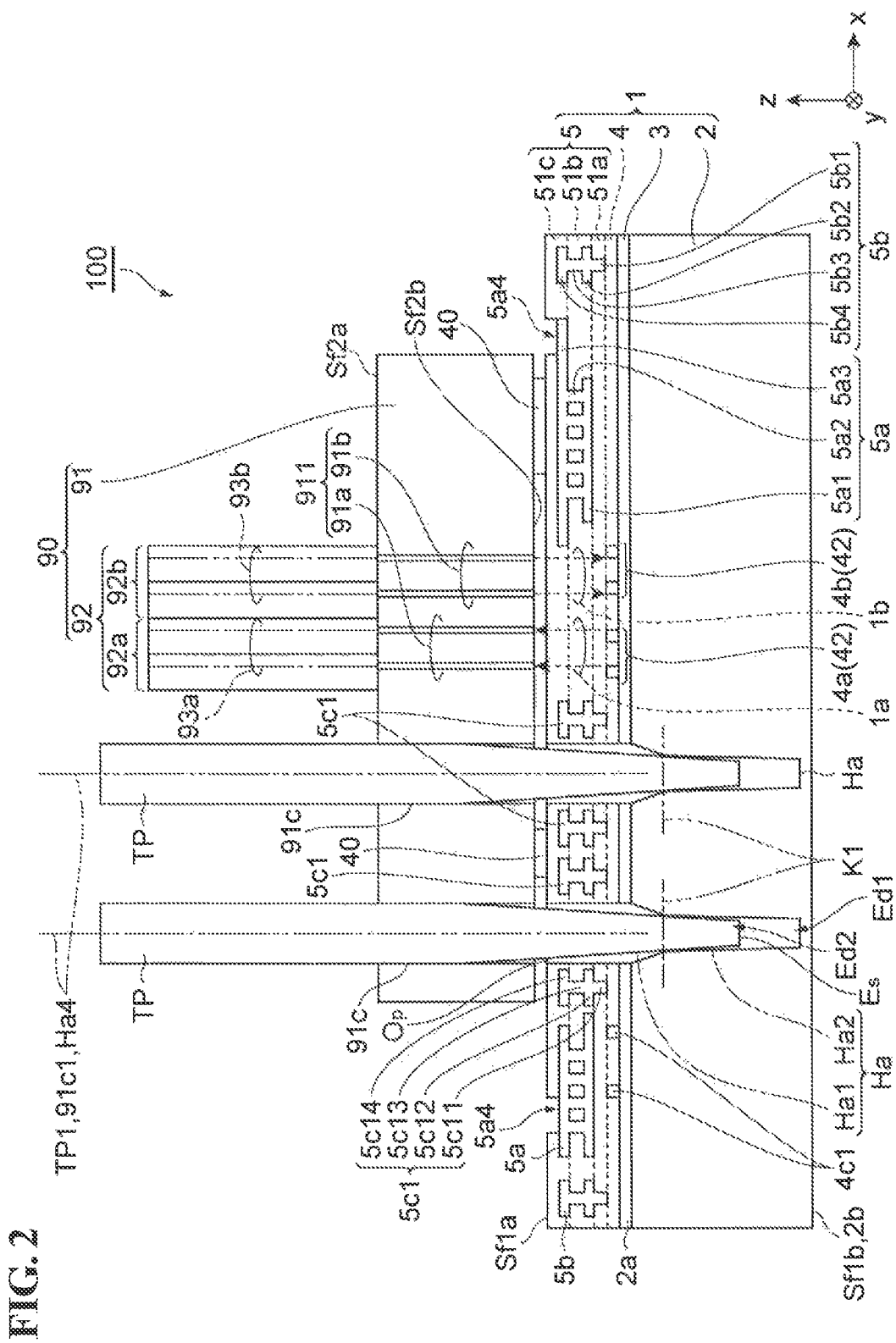
FIG. 2 shows the main internal structure of the optical semiconductor device according to the embodiment.
Figure 3:
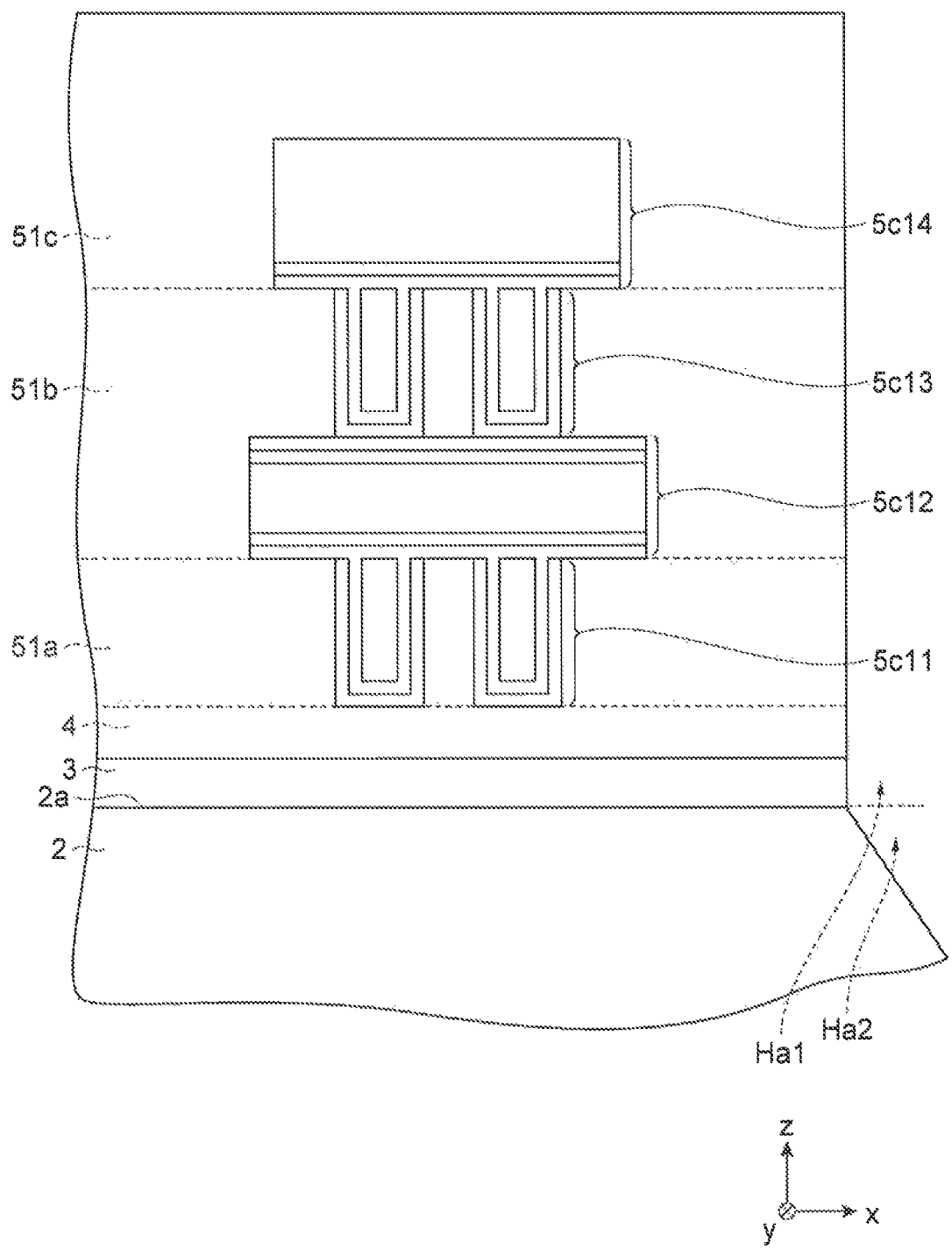

Next, some embodiments will be described in detail as referring to drawings. In describing the drawings, if possible, corresponding portions are given the same reference numerals and the same descriptions thereof are not given. A structure of an optical assembly 100 according to an embodiment is described with reference to FIGS. 1, 2, and 3. FIG. 1 shows an orthogonal coordinate system that is defined by an x axis, a y axis, and a z axis. The orthogonal coordinate system shown in FIG. 1 is the same as those shown in FIGS. 2 to 11. FIG. 1 is a perspective plan view (in an x-y plane) of an internal structure of an optical semiconductor device 1. FIG. 2 shows an internal structure of the optical assembly 100 as seen from a plane along line I-I in FIG. 1 (z-x plane). FIG. 3 primarily shows a moisture-proof 5c1 of the optical assembly 100 as seen from a plane that is the same as the plane (z-x plane) from which FIG. 2 is seen. The optical assembly 100 includes the optical semiconductor device 1, an optical waveguide device 90, two guide pins TP, and a joint 40. The optical semiconductor device 1 and the optical waveguide device 90 are joined to each other through the joint 40. The joint 40 is made of, for example, resin or solder.

The optical semiconductor device 1 includes a substrate 2, an oxide film 3, an optical waveguide unit 4, an electric wiring structure 5, two recesses Ha, a principal surface Sf1$a$, and a back surface Sf1$b$. The principal surface Sf1$a$ and the back surface Sf1$b$ both extend along the x-y plane. The principal surface Sf1$a$ is positioned on the side opposite to the back surface Sf1$b$. The oxide film 3 is provided on the substrate 2. The optical waveguide unit 4 is provided on the oxide film 3. The electric wiring structure 5 is provided on the optical waveguide unit 4. The back surface Sf1$b$, the substrate 2, the oxide film 3, the optical waveguide unit 4, the electric wiring structure 5, and the principal surface Sf1$a$ are disposed in that order in the direction of the z axis. The oxide film 3 is in contact with the substrate 2. The optical waveguide unit 4 is in contact with the oxide film 3. The electric wiring structure 5 is in contact with the optical waveguide unit 4. The substrate 2 has a back surface 2$b$ which is disposed opposite to a boundary surface between the substrate 2 and the oxide film 3. The back surface 2$b$ of the substrate 2 corresponds to the back surface Sf1$b$ of the optical semiconductor device 10. The electric wiring structure 5 has a top surface which is disposed opposite to a boundary surface between the electric wiring structure 5 and the optical waveguide unit 4. The top surface of the electric wiring structure 5 corresponds to the principal surface Sf1$a$ of the optical semiconductor device 1.

The optical waveguide unit 4 includes an optical device unit. The optical device unit of the optical waveguide unit 4 includes an optical connecting unit 42, an optical waveguide 4$c$1, an optical waveguide 4$c$2, and an optical modulator 4$d$. In the embodiment, the optical device unit includes two optical modulators as shown in FIG. 1. The optical connecting unit 42 includes a light output portion 4$a$ and a light input portion 4$b$. Each of the light output portion 4$a$ and the light input portion 4$b$ includes a grating coupler having a diffraction grating structure. The light output portion 4$a$ includes an optical waveguide 1a, and the light input portion 4b includes an optical waveguide 1b. The optical waveguide 1a and the optical waveguide 1b extend in the direction of the z axis.

The optical modulator 4d is a Mach-Zehnder modulator (MZM). The optical modulator 4d includes two modulation arms 4d1, a 1×2 multi-mode interface (MMI) coupler 4d2, and a 1×2 multi-mode interface (MMI) coupler 4d3. The two modulation arms 4d1 are disposed parallel to each other. One end of each optical waveguide 4c1 and an end of each of the two modulation arms 4d1 are optically coupled to the 1×2 MMI coupler 4d2. The other end of each optical waveguide 4c1 is optically coupled to its corresponding light output portion 4a. One end of each optical waveguide 4c2 and the other end of each of the two modulation arms 4d1 are optically coupled to the 1×2 MMI coupler 4d3. The other end of each optical waveguide 4c2 is connected to its corresponding light input portion 4b. The two modulation arms 4d1 of the optical modulator 4d extend between the 1×2 MMI coupler 4d2 and the 1×2 MMI coupler 4d3.

The optical waveguide 4c1, the optical waveguide 4c2, the 1×2 MMI coupler 4d2, and the 1×2 MMI coupler 4d3 have a rectangular cross section (defined by a plane that is perpendicular to the principal surface Sf1a). The modulation arm 4d1 has a ridge cross section (defined by the plane that is perpendicular to the principal surface Sf1a). The optical device unit of the optical waveguide unit 4 is embedded in a film formed of the same material (such as silicon oxide ($SiO_2$)) as the electric wiring structure 5.

The modulation arm 4d1 includes an n-type region 4d11 and a p-type region 4d12. The n-type region 4d11 and the p-type region 4d12 of the modulation arm 4d1 extend from the 1×2 MMI coupler 4d2 towards the 1×2 MMI coupler 4d3 (direction of the x axis). The n-type region 4d11 and the p-type region 4d12 of the modulation arm 4d1 are in contact with each other. By applying a voltage between the n-type region 4d11 and the p-type region 4d12 of the modulation arm 4d1, it is possible to modulate light passing through the modulation arm 4d1 because the effective refractive index of the modulation arm 4d1 changes depending on the applied voltage. By changing the effective refractive index of the modulation arm 4d1 of the optical modulator 4d, phase of light passing through the modulation arm 4d1 is modulated depending on the applied voltage. Light passing through each of the modulation arms 4d1 enters into the 1×2 MMI coupler 4d3, and is coupled to each other at the 1×2 MMI coupler 4d3. In this case, the intensity of light output from the 1×2 MMI coupler 4d3 is modulated depending on the applied voltage.

The light output portion 4a and the light input portion 4b have a rectangular cross section. The light output portion 4a and the light input portion 4b may have a ridge waveguide structure. The light output portion 4a and the light input portion 4b are each provided with a grating. The gratings have periodic projections and recesses along a direction of propagation of light. The period of the grating is set, for example, on the order of the wavelength of light propagating in the waveguides 4c1 and 4e2 (that is, on the order of a value ($\lambda_0/n_e$) that is obtained by dividing a wavelength $\lambda_0$ in a vacuum by an effective refractive index $n_e$). By using the grating structure of the light output portion 4a, the light propagating through the optical waveguide 4c1 is output to the outside from the light output portion 4a through the principal surface Sf1a of the optical semiconductor device 1. Alternatively, by using the grating structure of the light input portion 4b, light that is incident upon the light input portion 4b from the outside through the principal surface Sf1a is coupled to the optical waveguide 4c2.

The electric wiring structure 5 includes a first layer 51a, a second layer 51b and a third layer 51c. The first layer 51a, the second layer 51b, and the third layer 51c each include an insulating film formed of the same material (insulating film of the electric wiring structure 5). The first layer 51a is formed on the optical waveguide unit 4. The second layer 51b is formed on the first layer 51a. The third layer 51c is formed on the second layer 51b. The first layer 51a, the second layer 51b, and the third layer 51c are disposed in that order in the direction of the z axis. The first layer 51a is in contact with the optical waveguide unit 4. The second layer 51b is in contact with the first layer 51a. The third layer 51c is in contact with the second layer 51b. The electric wiring structure 5 also includes an electric wiring section 5a, a moisture-proof structure 5b, and a moisture-proof structure 5c1. The electric wiring section 5a, the moisture-proof structure 5b, and the moisture-proof structure 5c1 are embedded in the insulating film of the electric wiring structure 5. The electric wiring section 5a, the moisture-proof structure 5b, and the moisture-proof structure 5c1 include a metal layer. The electric wiring section 5a, the moisture-proof structure 5b, and the moisture-proof structure 5c1 each have a multilayer structure extending from the first layer 51a to the third layer 51c through the second layer 51b.

In the embodiment, the electric wiring section 5a includes a total of eight electric wires for applying voltage to the four n-type regions 4d11 and the four p-type regions 4d12. The eight electric wires are electrically connected to the four n-type regions 4d11 and the four p-type regions 4d12 through plugs (not shown) provided at the first layer 51a along the four n-type regions 4d11 and the four p-type regions 4d12. The electric wiring section 5a includes a conductor pattern 5a1, a plug 5a2, and a conductor pattern 5a3. The plug 5a2 is disposed between the conductor pattern 5a1 and the conductor pattern 5a3, and is electrically connected to the conductor pattern 5a1 and the conductor pattern 5a3. The conductor pattern 5a1 and the conductor pattern 5a3 are electrically connected to each other through the plug 5a2. The conductor pattern 5a1 and the plug 5a2 are provided in the second layer 51b. The conductor pattern 5a3 is provided in the third layer 51c. The conductor pattern 5a3 covers the insulating layer of the third layer 51c. An opening portion 5a4 of the third layer 51c is provided in part of a surface of the conductive pattern 5a3. The conductor pattern 5a3 that is exposed through the opening portion 5a4 functions as a bonding pad.

The moisture-proof structure 5b is provided along an outer periphery of the optical semiconductor device 1. The moisture-proof structure 5b is embedded in the insulating film of the electric wiring structure 5. In plan view (in the x-y plane), the moisture proof structure 5b surrounds the optical device unit of the optical waveguide unit 4 and the electric wiring section 5a. The moisture-proof structure 5b is capable of intercepting moisture that permeates the optical semiconductor device from a side surface of the outer periphery of the optical semiconductor device 1. Therefore, with the moisture-proof structure 5b, oxidation corrosion of the electric wiring section 5a in the electric wiring structure 5 is prevented.

The moisture-proof structure 5b includes a plug 5b1, a conductor pattern 5b2, a plug 5b3, and a conductor pattern 5b4. The plug 5b1, the conductor pattern 5b2, the plug 5b3, and the conductor pattern 5b4 are disposed in that order from the first layer 51a to the third layer 51c (that is, in the direction of the z axis). The plug 5b1 is connected to the conductor pattern 5b2. The plug 5b3 is connected to the conductor pattern 5b2 and the conductor pattern 5b4. The plug 5b1 and the conductor pattern 5b4 are connected to each other through the conductor pattern 5b2 and the plug 5b3. The plug 5b1 is provided in the first layer 51a. The conductor pattern 5b2 and the plug 5b3 are provided in the second layer 51b. The conductor pattern 5b4 is provided in the third layer 51c. The conductor pattern 5b4 is covered by the insulating film of the third layer 51c.

The moisture-proof structure 5c1 is provided on the substrate 2. The moisture-proof structure 5c1 is embedded in the insulating film of the electric wiring structure 5. In plan view (that is, in the x-y plane), the moisture-proof structure 5c1 is provided between the electric wiring section 5a and a recess Ha. In plan view (in the x-y plane), the moisture-proof structure 5c1 surrounds the recesses Ha. The moisture-proof structure 5c1 intercepts moisture that permeates the optical semiconductor device from a side surface of its corresponding recess Ha. With the moisture-proof structure 5c1, oxidation corrosion of the electric wiring section 5a in the electric wiring structure 5 is prevented. That is, in plan view (in the x-y plane), the electric wiring section 5a of the electric wiring structure 5 is surrounded by the moisture-proof structure 5b and the moisture-proof structure 5c1. Therefore, it is possible not only to intercept moisture that permeates the optical semiconductor device from a side surface of the outer periphery of the optical semiconductor device 1, but also to intercept moisture that permeates the optical semiconductor device from a side surface of the recess Ha.

As shown in FIG. 3, the moisture-proof structure 5c1 includes a plug 5c11, a conductor pattern 5c12, a plug 5c13, and a conductor pattern 5c14. The plug 5c11, the conductor pattern 5c12, the plug 5c13, and the conductor pattern 5c14 are disposed in that order (in the direction of the z axis) from the first layer 51a towards the third layer 51c. The plug 5c11 is connected to the conductor pattern 5c12. The plug 5c13 is connected to the conductor pattern 5c12 and the conductor pattern 5c14. The plug 5c11 and the conductor pattern 5c14 are connected to each other through the conductor pattern 5c12 and the plug 5c13. The plug 5c11 is provided in the first layer 51a. The conductor pattern 5c12 and the plug 5c13 are provided in the second layer 51b. The conductor pattern 5c14 is provided in the third layer 51c. The conductor pattern 5c14 is embedded in the insulating film of the third layer 51c.

A recess Ha is provided for fitting a guide pin TP. In the embodiment, the two recesses Ha are provided for fitting each of the guide pins TP. The recess Ha is provided in the principal surface Sf1a. The recess Ha extends from the principal surface Sf1a to the substrate 2. Center axis Ha4 of the recess Ha is substantially orthogonal to the principal surface Sf1a.

The recess Ha includes a first region Ha1 and a second region Ha2 adjacent to the first region Ha1. The first region Ha1 and the second region Ha2 of the recess Ha are disposed in that order from the principal surface Sf1a to the back surface Sf1b. The second region Ha2 is extended to the middle portion of the substrate 2, and includes an end portion Ed1 of the recess Ha in the substrate 2. An opening Op is formed at the principal surface Sf1a in the position corresponding to the first region Ha1 of the recess Ha. In the embodiment, a boundary surface K1 between the first region Ha1 and the second region Ha2 is positioned in the substrate 2. The first region Ha1 of the recess Ha has a taper portion in which the diameter of the first region Ha1 increases towards a principal surface 2a of the substrate 2 from the boundary surface K1 between the first region Ha1 and the second region Ha2. The first region Ha1 of the recess Ha has a uniform diameter from the principal surface 2a towards the principal surface Sf1a. The second region Ha2 of the recess Ha has a taper portion whose diameter decreases from the boundary surface K1 towards the end portion Ed1. The guide pin TP includes an end portion Ed2 with an end surface Es. The end portion Ed2 of the guide pin TP has a taper portion whose diameter decreases towards the end surface Es of the end portion Ed2. The taper portion of the first region Ha1 has a taper ratio that is larger than that of the taper portion of the end portion Ed2 of the guide pin TP. The taper portion of the end portion Ed2 has a taper ratio that is larger than that of the taper portion of the second region Ha2. The guide pin TP is in contact with a wall of a through-hole 91c of a base 91 of the optical waveguide device 90 (The through-hole 91c of the base 91 will be described later). The end portion Ed2 of the guide pin TP is in contact with a wall of the recess Ha at the boundary surface K1. Here, the term "taper ratio" is defined as a value that is obtained by dividing the difference between a maximum diameter and a minimum diameter at the tapering region, in which the diameter changes due to the tapered shape, by the length of the tapering region.

The optical waveguide device 90 includes a base 91 and an optical waveguide 92. The optical waveguide device 90 is provided on the principal surface Sf1a of the optical semiconductor device 1. The base 91 is provided on the principal surface Sf1a. The optical waveguide 92 is provided on the base 91. The base 91 includes an optical waveguide section 911, a through-hole 91c, a principal surface Sf2a, and a back surface Sf2b. In the embodiment, two through-holes 91c are formed in the base 91. The principal surface Sf2a and the back surface Sf2b extend along the x-y plane. The back surface Sf2b of the base 91 is arranged so as to face the principal surface Sf1a of the optical semiconductor device 1. The optical waveguide 92 is provided on the principal surface Sf2a of the base 91.

The through-holes 91c are provided for inserting the respective guide pins TP therein. The two through-holes 91c extend through the back surface Sf2b of the base 91 from the principal surface Sf2a of the base 91 along the direction of the z axis.

The guide pin TP, the recess Ha, and the through-hole 91c extend in the direction of the z axis that is substantially orthogonal to the principal surface Sf1a. The guide pin TP has a center axis TP1. The recess Ha has a center axis Ha4. The through-hole 91c has a center axis 91c1. The center axis TP1 of the guide pin TP, the center axis 91c1 of the through-hole 91c, and the center axis Ha4 of the recess Ha are all provided along the direction of the z axis. In the embodiment, the two recesses Ha are connected with either one of the two through-holes 91c. One guide pin TP is inserted into each pair of recess Ha and through-hole 91c that are connected to each other. The center axis Ha4 of the recess Ha and the center axis 91c1 of the through-hole 91c are aligned with each other. The recess Ha is connected with the corresponding through-hole 91c through the guide pin TP. The center axis TP1 of the guide pin TP is also aligned with the center axis Ha4 of the recess Ha and the center axis 91c1 of the through-hole 91c.

The optical waveguide section 911 extends in the direction of the z axis from the principal surface Sf2a to the back surface Sf2b. The optical waveguide section 911 includes an output waveguide section 91a and an input waveguide section 91b. The optical waveguide 92 includes an output waveguide 92a and an input waveguide 92b. In addition, the output waveguide 92a includes an optical waveguide 93a, and the input waveguide 92b includes an optical waveguide 93b. The optical waveguide 93a of the output waveguide 92a is optically coupled to the output waveguide section 91a of the optical waveguide section 911. The optical waveguide 93b of the input waveguide 92b is optically coupled to the input waveguide section 91b of the optical waveguide section 911. The optical waveguides 93a and 93b extend in the direction of the z axis.

The optical waveguide 1a of the optical semiconductor device 1 is optically coupled to the optical waveguide 93a of the optical waveguide device 90 through the output waveguide section 91a. The optical waveguide 1b of the optical semiconductor device 1 are optically coupled to the optical waveguide 93b of the optical waveguide device 90 through the input waveguide section 91b. The optical waveguides 1a and 1b of the optical semiconductor device 1 also extend in the direction of the z axis.

As described above, the optical semiconductor device 1 and the optical waveguide device 90 are arranged so that the principal surface Sf1a and the back surface Sf2b face each other. Further, the optical semiconductor device 1 and the optical waveguide device 90 are arranged so that each of the center axes Ha4 of the two recesses Ha is aligned with one of the center axes 91c1 of the through-holes 91c. Still further, the optical waveguide 1a and the optical waveguide 1b of the optical semiconductor device 1 are optically coupled with the optical waveguide 93a and the optical waveguide 93b of the optical waveguide device 90, respectively.

The substrate 2 is formed of Si. The substrate 2 has a thickness of about 725 μm. The oxide film 3 is made of for example, silicon oxide ($SiO_2$). Hereinafter, the oxide film 3 will be denoted as the silicon oxide ($SiO_2$) film 3. The silicon oxide ($SiO_2$) film 3 may be formed of a buried oxide (BOX) layer on the Si substrate 2. The silicon oxide ($SiO_2$) film 3 has a thickness of about 2 μm. In the optical waveguide unit 4, an Si optical device unit is embedded in a silicon oxide ($SiO_2$) layer. The optical device unit of the optical waveguide unit 4 includes the optical connecting unit 42, the optical waveguide 4c1, the optical waveguide 4c2, and the optical modulator 4d. The optical device unit of the optical waveguide unit 4 is made of Si. The optical waveguide unit 4 has a thickness of about 0.3 μm.

The first layer 51a, the second layer 51b, and the third layer 51c are formed of an insulating film such as a silicon oxide ($SiO_2$) film. The first layer 51a has a film thickness of about 300 nm. The second layer 51b has a film thickness of about 1100 nm. The third layer 51c has a film thickness of about 1300 nm.

The conductor pattern 5a1, the conductor pattern 5b2, and the conductor pattern 5c12 have a layered structure of TiN (50 nm)/Ti (10 nm)/AlCu (500 nm)/Ti (10 nm)/TiN (50 nm). The plug 5a2, the plug 5b1, the plug 5b3, the plugs 5c11, and the plugs 5c13 have a layered structure of Ti (30 nm)/TiN (100 nm)/W (800 nm). The conductor pattern 5a3, the conductor pattern 5b4, and the conductor pattern 5c14 have a layered structure of TiN (50 nm)/Ti (10 nm)/AlCu (800 nm).

The base 91 is formed of, for example, resin, such as polyphenylene sulfide resin. The resin of the base 91 may include a glass filler. The diameter of the through-hole 91c in the base 91 is set to be 800 μm±1 μm, for example.

The taper ratio of the taper portion of the first region Ha1 is approximately 0.22. The taper ratio of the taper portion of the second region Ha2 is approximately 0.02. The taper ratio of the taper portion of the end portion Ed2 of the guide pin TP is approximately 0.1.

The taper portion of the first region Ha1 has a length of about 150 μm from the principal surface 2a of the substrate 2 towards the back surface Sf1b of the substrate 2. The second region Ha2 of the recess Ha has a length of about 480 μm towards the back surface Sf1b from the boundary surface K1 between the first region Ha1 and the second region Ha2 of the recess Ha. The boundary surface K1 has a diameter of about 600 μm.

The guide pin TP may be formed by grinding a steel material made of SUS303 stainless steel using a centerless inked grinding method after machining the steel material using a numerical control (NC) lathe. The end portion Ed2 of the guide pin TP has a taper portion. The end surface Es has a diameter of 0.560 to 0,595 mm. A portion of each guide pin TP excluding the tapering end portion Ed2 has a diameter of 0.8 mm±0.001 mm, for example.

In the optical assembly 100 having the above-described structure, a fixing member such as resin or solder is filled into a gap between the optical semiconductor device 1 and the optical waveguide device 90 so as to fix the optical semiconductor device 1 and the optical waveguide device 90 (in particular, the base 91), while the two guide pins TP are inserted into the optical waveguide device 90 and the optical semiconductor device 1. Then, the fixing member is cured, and a cured fixing member becomes a joint 40 disposed between the optical semiconductor device 1 and the optical waveguide device 90 as shown in FIG. 2. The optical semiconductor device 1 and the optical waveguide device 90 are fixed by the joint 40 made of the cured fixing member. By inserting the guide pins TP into the recesses Ha of the optical semiconductor device 1 and the through-holes 91c of the optical waveguide device 90, respectively, the relative position between the optical semiconductor device 1 and the optical waveguide device 90 is precisely and easily determined. Therefore, in the embodiment, a process of precisely aligning the positions of the optical semiconductor device 1 and the optical waveguide device 90 is not required. After fixing the optical semiconductor device 1 and the optical waveguide device 90, the guide pins TP may be removed from the optical semiconductor device 1 and the optical waveguide device 90. Furthermore, after removing the guide pins TP from the optical semiconductor device 1 and the optical waveguide device 90, the through-holes 91c and the recesses Ha may be filled with resin or the like.

When the guide pin TP is inserted into the recess Ha of the optical semiconductor device 1, the guide pin TP is uniformly abutted onto a side wall surface of the recess Ha because the guide pin TP has the tapering end portion Ed2. Therefore, the center axis Ha4 of the recess Ha and the center axis TP are aligned with a high precision regardless of variations in the diameters of the recesses Ha. The side wall surface of the recess Ha is abutted to the guide pin TP at the boundary surface K1 between the first region Ha1 and the second region Ha2. The boundary surface K1 exists in the substrate 2. Therefore, the guide pin TP contacts the side wall surface of the corresponding recess Ha in the inside of the substrate 2 having a relatively high rigidity. As a result, cracking caused by contact of the guide pin TP with the side wall surface of the recess Ha is reduced. Crystal defects caused by the cracking are also suppressed. Even if cracking occurs in the substrate 2, the cracking is stopped in the inside of the substrate 2 because the substrate 2 has a relatively high rigidity. Further, it is possible to prevent the cracks in the substrate 2 from reaching the optical waveguide unit 4 by the silicon oxide (SiO$_2$) film 3.

In the embodiment, the optical semiconductor device 1 includes a single moisture-proof structure 5b. The optical semiconductor device 1 may include a plurality of moisture-proof structures 5b. In such a case, in the optical semiconductor device 1, a moisture-proof structure 5b is provided at an inner side of another moisture-proof structure 5b in plan view (in the x-y plane).

In the embodiment, in the optical semiconductor device 1, a single moisture-proof structure 5c1 is provided around each of the recesses Ha. A plurality of moisture-proof structures 5c1 may be provided around each of the recesses Ha. In this case, in the optical semiconductor device 1, a moisture-proof structure 5c1 is provided at an inner side of another moisture-proof structure 5c1 in plan view (in the x-y plane).

In the embodiment, the optical semiconductor device 1 includes a single second layer 51b. The optical semiconductor device 1 may include a plurality of second layers 51b. In this case, the plurality of second layers 51b are stacked upon each other between the first layer 51a and the third layer 51c from the first layer 51a towards the third layer 51c (in the direction of the z axis).

In the embodiment, the optical semiconductor device 1 includes two sets of the guide pin TP, the recess Ha, and the through-hole 91c. The optical semiconductor device 1 may include three or more sets of the guide pin TP, the recess Ha, and the through-hole 91c.

In the embodiment, the optical assembly 100 has an optical signal output structure (the light output portion 4a, the output waveguide section 91a, and the output waveguide 92a) and an optical signal input structure (the light input portion 4b, the input waveguide section 91b, and the input waveguide 92b). The optical assembly 100 may include only one of the optical signal output structure and the optical signal input structure.

In the embodiment, the optical semiconductor device 1 includes two light output portions 4a and two light input portions 4b. The number of the light output portion 4a and the number of the light input portion 4b are independently adjustable. In this case, the numbers of the optical waveguide 4c1, the optical waveguide 4c2, the optical modulator 4d, the output waveguide section 91a, the input waveguide section 91b, the output waveguide 92a, and the input waveguide 92b may be set in accordance with the number of the light output portion 4a and the number of the light input portion 4b. In the embodiment, the optical waveguide 93a, the optical waveguide 93b, the optical waveguide 1a and the optical waveguide 1b extend in the direction of the z axis. The optical waveguide 93a, the optical waveguide 93b, the optical waveguide 1a, and the optical waveguide 1b may extend slantwise in the direction of the z axis. Even in this case, the optical waveguide 1a and the optical waveguide 1b are optically coupled with the optical waveguide 93a and the optical waveguide 93b, respectively.

First Example

With reference to FIG. 4A to FIG. 11, a method for producing the optical assembly 100 according to the embodiment is described. FIGS. 4A, 4B, 5A, 5B, 7A, 7B, 8A, 8C, 9A, and 9B show the main steps of the method for producing the optical assembly 100. FIGS. 4A, 5A, 7A, 8A, and 9A show a product as seen from a plane (x-y plane) that is the same as the plane from which FIG. 1 is seen. FIGS. 4B, 5B, 7B, 8B, and 9B show the product shown in FIGS. 4A, 5A, 7A, 8A, and 9A as seen from a plane (z-x plane) that is the same as the plane from which FIG. 2 is seen. FIGS. 6, 10A, 10B, and 11 show a main step of the method for producing the optical assembly 100, and a product as seen from a plane (z-x plane) that is the same as the plane from which FIG. 2 is seen.

Figure 4A:
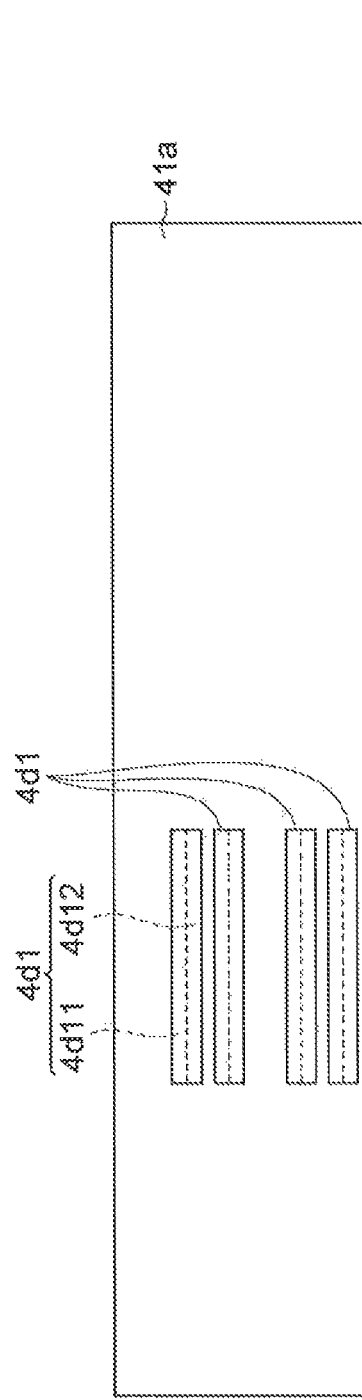
FIGS. 4A and 4B show a main step of a method for producing the optical semiconductor device according to the embodiment.
Figure 4B:
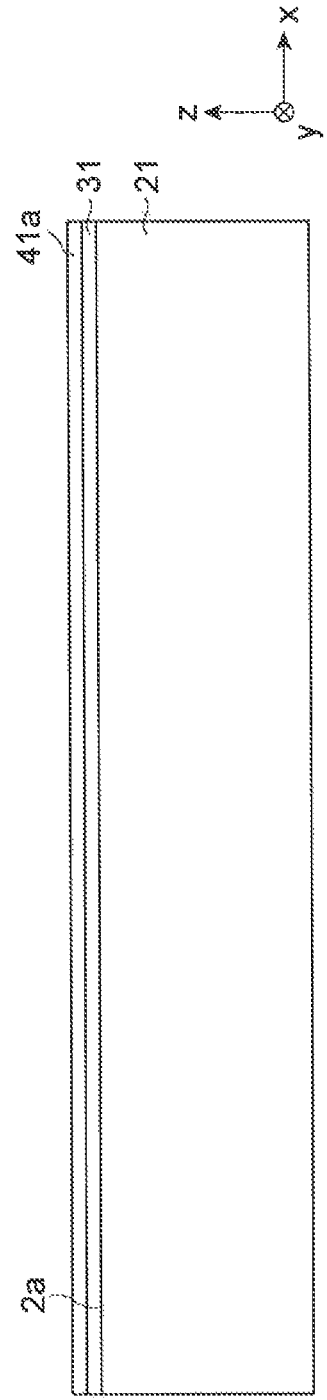
Figure 11:
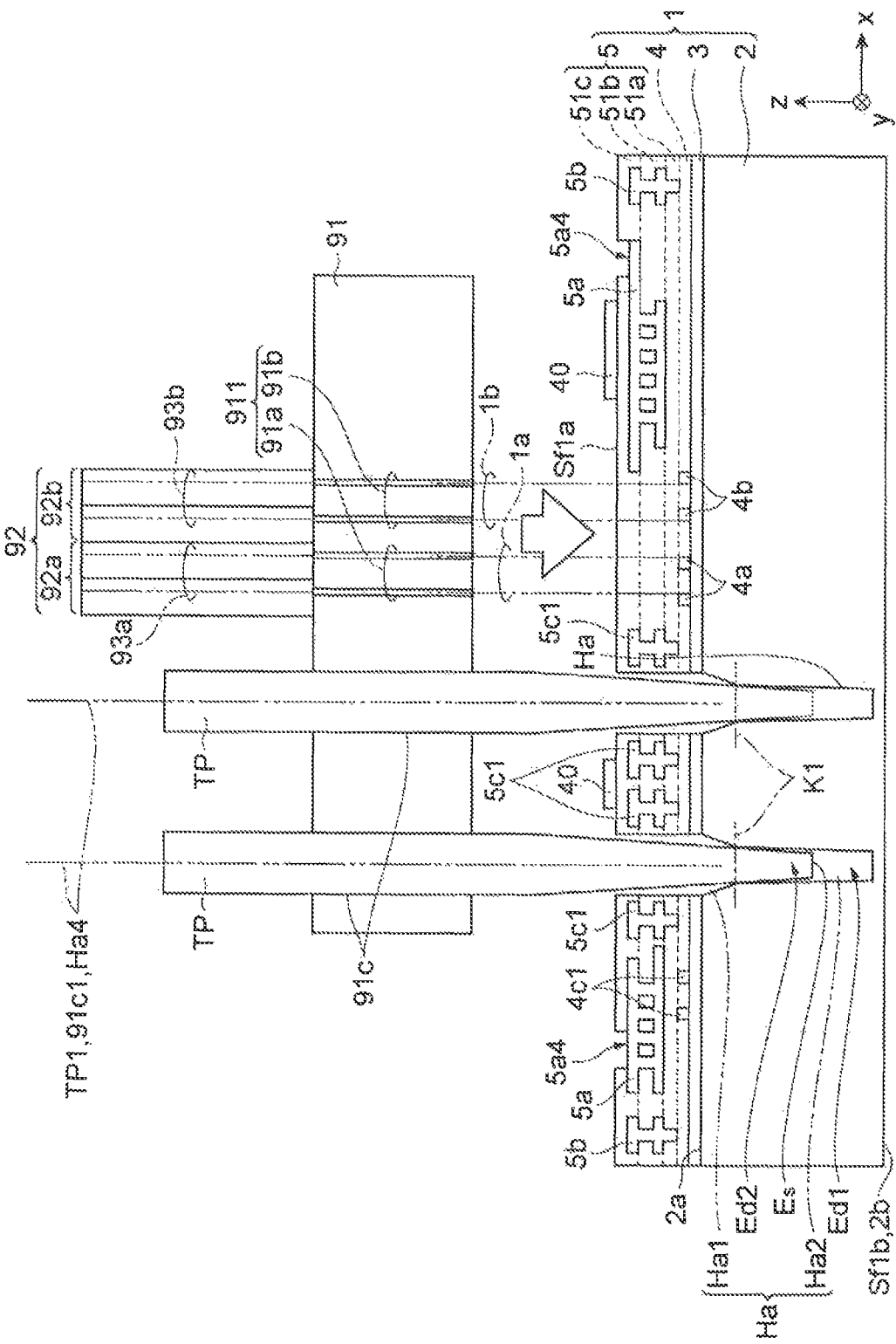
FIG. 11 shows a main step of the method for producing the optical semiconductor device according to the embodiment, and shows a product as seen from the z-x plane.

First, as shown in FIGS. 4A and 4B, an SOI substrate is provided. The SOI substrate includes a silicon (Si) substrate 21 (wafer), a silicon oxide (SiO$_2$) film 31 (BOX layer) formed on the Si substrate 21, and a silicon (Si) layer 41a formed on the silicon oxide film 31. The Si substrate has a thickness of about 725 µm. The silicon oxide film 31 has a thickness of about 2 µm. The Si layer 41a has a thickness of about 0.3 µm. In the Si layer 41a, an n-type region 4d11 and a p-type region 4d12 are formed so as to form an optical modulator 4d. The n-type region 4d11 is formed by ion implantation of phosphorous (P), and the p-type region 4d12 is formed by ion implantation of boron (B). After the ion implantation of phosphorous (P) and boron (B) into the Si layer 41a, an annealing process is performed on the ion-implanted wafer.

As shown in FIGS. 5A and 5B, the Si layer 41a is etched by using a resist mask (not shown) having a pattern of an optical device unit of an optical waveguide unit 4. After etching the Si layer 41a, the pattern is transferred to the Si layer 41a. As a result, a pattern of the Si layer 41a for forming the optical device unit is formed on the silicon oxide film 31. Then, the resist mask is removed. The pattern of the Si layer 41a for forming the optical device unit includes patterns for forming a light output portion 4a, a light input portion 4b, an optical waveguide 4c1, an optical waveguide 4c2, and an optical modulator 4d.

In the light output portion 4a and the light input portion 4b, grooves having a predetermined period are formed in the Si layer 41a so as to form a diffraction grating structure. The diffraction grating structure has a period on the order of a wavelength (λ) propagating through an optical waveguide, and has a depth of about 0.15 µm. Here, the wavelength (λ) propagating through the optical waveguide having an effective refractive index $n_e$ is equal to a value ($\lambda_0/n_e$) obtained by dividing a wavelength $\lambda_0$ of light in a vacuum by the effective refractive index $n_e$. The optical modulator 4d is formed by etching the Si layer 41a so as to have a ridge structure having a height (etching depth) of about 0.2 µm. The optical waveguide 4c1, the 1×2 multi-mode interface (MMI) coupler 4d2, and the 1×2 multi-mode interface (MMI) coupler 4d3 have a rectangular cross section.

Next, as shown in FIG. 6, the optical device unit formed on the silicon oxide (SiO$_2$) film 31 is covered with silicon oxide (SiO$_2$) layer so as to form an optical waveguide unit 41b. Further, a silicon oxide (SiO$_2$) layer having a thickness of about 700 nm is formed on the optical waveguide unit 41b. Thereafter, by using chemical mechanical polishing (CMP) method, the silicon oxide (SiO$_2$) layer formed on the optical waveguide unit 41b is polished so as to have a flat surface. The polished silicon oxide (SiO$_2$) layer on the optical waveguide unit 41b has a thickness of about 300 nm. By these steps, a first layer 51a1 is formed.

Next, as shown in FIGS. 7A and 7B, the first layer 51a1 is etched by using a resist-mask (not shown) so as to form a plurality of openings through which a surface of the n-type region 4d11 and a surface of the p-type region 4d12 are exposed. A first metal layer is formed in the plurality of openings as an electrode. The first metal layer is in contact with the surface of n-type regions 4d11 and the surface of the p-type regions 4d12 through the plurality of openings. By this process, plugs 4d11a and plugs 4d12a are formed. When the first layer 51a1 is etched by using the resist-mask (not shown) to form the plurality of openings, grooves are simultaneously formed by etching the first layer 51a1 using the same resist-mask in a portion where a moisture-proof structure 5b is formed and a portion where moisture-proof structures 5c1 are formed. In the embodiment, the moisture-proof structure 5b is formed along an outer periphery of the first layer 51a1. The moisture-proof structures 5c1 are formed surrounding portions R1 where recesses Ha are formed. By filling these grooves with the first metal layer, a plug 5b1 and plugs 5c11 are formed. In order to form the plugs 4d11a, the plugs 4d12a, the plug 5b1, and the plugs 5c11, the first metal layer including Ti (30 nm)/TiN (100 nm)/W (800 nm) is formed so as to cover the entire surface of the first layer 51a1. And, thereafter, a part of the first metal layer other than a region where the plugs 4d11a, the plugs 4d12a, the plug 5b1, and the plugs 5c11 are formed is partially and selectively removed by etching. In this way, a first layer 51a2 is formed by forming the plugs 4d11a, the plugs 4d12a, the plug 5b1, and the plugs 5c11 with respect to the first layer 51a1.

Next, as shown in FIGS. 8A and 8B, a second metal layer including TiN (50 nm)/Ti (10 nm)/AlCu (500 nm)/Ti (10 nm)/TiN (50 nm) is formed on the entire surface of the first layer 51a2. Thereafter, the second metal layer is partially and selectively etched to form a conductor pattern 5b2, a conductor pattern 5a1, and a conductor pattern 5c12. As a result, the conductor pattern 5b2, the conductor pattern 5a1, and the conductor pattern 5c12 are formed on the surface of the first layer 51a2. Next, a silicon oxide ($SiO_2$) layer having a thickness of about 2 µm is formed on the surface of the first layer 51a2 so as to cover the conductor pattern 5b2, the conductor pattern 5a1, and the conductor pattern 5c12. Thereafter, the surface of the silicon oxide ($SiO_2$) layer is polished by using CMP method so that the surface of the silicon oxide ($SiO_2$) layer is made flat. By polishing the silicon oxide ($SiO_2$) layer, the silicon oxide ($SiO_2$) layer on the conductor pattern 5b2, the conductor pattern 5a1, and the conductor pattern 5c12 has a thickness of about 500 nm. A portion of the silicon oxide ($SiO_2$) layer on the conductor pattern 5c12, the conductor pattern 5a1, and the conductor pattern 5c12 is etched to expose surfaces of the conductor pattern 5b2, the conductor pattern 5a1, and the conductor pattern 5c12. As a result of this etching, openings of the silicon oxide ($SiO_2$) layer are formed on the conductor pattern 5b2, the conductor pattern 5a1, and the conductor pattern 5c12. A third metal layer including Ti (30 nm)/TiN (100 nm)/W (800 nm) is formed in the openings so as to form a plug 5b3, a plug 5a2, and a plug 5c13. In the step of forming the plug 5b3, the plug 5a2, and the plug 5c13, the third metal layer including Ti (30 nm)/TiN (100 nm)/W (800 nm) is formed on the entire surface of the silicon oxide ($SiO_2$) layer and in the openings of the silicon oxide ($SiO_2$) layer formed on the first layer 51a2. Thereafter, a part of the third metal layer formed on the surface of the silicon oxide ($SiO_2$) layer is partially and selectively etched so as to form the plug 5b3, the plug 5a2, and the plug 5c13. In this way, a second layer 51b2 including the conductor pattern 5b2, the conductor pattern 5a1, the conductor pattern 5c12, the plug 5b3, the plug 5a2, and the plug 5c13 is formed on the first layer 51a2. When a plurality of second layers 51b are to be provided, after forming the first layer 51a2, the same step of forming the aforementioned second layer 51b2 is repeated for the number of second layers 51b.

Next, a third layer 51c2, which corresponds to a topmost layer, is formed. A fourth metal layer including TiN (50 nm)/Ti (10 nm)/AlCu (800 nm) is formed on the entire surface of the second layer 51b2. Thereafter, the fourth metal layer is partially and selectively etched so as to form a conductor pattern 5b4, a conductor pattern 5a3, and a conductor pattern 5014 on the surface of the second layer 51b2. Next, a silicon oxide ($SiO_2$) layer having a thickness of about 2 µm is formed on the second layer 51b2 so as to cover the conductor pattern 5b4, the conductor pattern 5a3, and the conductor pattern 5c14. Thereafter, the surface of the silicon oxide ($SiO_2$) layer is polished by using CMP method so that the surface of the silicon oxide ($SiO_2$) layer is made flat. By polishing the silicon oxide ($SiO_2$) layer, the silicon oxide ($SiO_2$) layer on the conductor pattern 5b4, the conductor pattern 5a3, and the conductor pattern 5c14 has a thickness of about 500 nm. Further, the silicon oxide ($SiO_2$) layer on the conductor pattern 5a3 is etched to expose a surface of the conductor pattern 5a3 by using a resist mask. By the etching, an opening portion 5a4 having a square shape with dimensions of about 150 µm×150 µm is formed. By the above steps, the third layer 51c2 including the conductor pattern 5b4, the conductor pattern 5a3, the conductor pattern 5c14, and the opening portion 5a4 is formed. The thickness of the conductor pattern 5a3 is greater than the thickness of the conductor pattern 5a1 because the conductor pattern 5a3, which is the topmost layer, is used as a bonding pad requiring a relatively high strength.

Next, as shown in FIGS. 9A and 9B, a surface of the third layer 51c2 is covered with a resist. Thereafter, a resist mask M1 having a circular opening pattern M1a is formed on the portion R1 where the recess Ha is formed using a photolithography technique. The circular opening pattern M1a has a diameter of 633 µm. Using the resist mask, the third layer 51c2, the second layer 51b2, the first layer 51a2, the optical waveguide unit 41b, the silicon oxide ($SiO_2$) film 31, and the silicon (Si) substrate 21 are etched. As a result of this etching, the recess Ha is formed as shown in FIG. 10A. In the embodiment, the Si substrate 21 becomes a substrate 2. The silicon oxide ($SiO_2$) film 31 becomes a silicon oxide ($SiO_2$) film 3. The optical waveguide unit 41b becomes an optical waveguide unit 4. The first layer 51a2 becomes a first layer 51a. The second layer 51b2 becomes a second layer 51b. The third layer 51c2 becomes a third layer 51c.

The step of forming the recess Ha is described in detail. First, the first region Ha1 is formed. In the first region Ha1, the substrate 21 made of silicon (Si) is etched by reactive ion etching (RIB) using an inductively coupled plasma (ICP) etching apparatus. The ICP etching apparatus includes a vacuum chamber, a high-frequency power source (ICP power source), and a high-frequency power source (Bias power source). The vacuum chamber includes a lower electrode and an upper electrode facing the lower electrode. The upper electrode is grounded. The substrate (wafer) is disposed on the lower electrode. The Bias power source is connected to the lower electrode so as to bias the substrate by supplying a Bias power to the lower electrode. The lower electrode has a cooling mechanism, which can cool the substrate. In addition, an induction coil is disposed on the side face of the vacuum chamber. The ICP power source is connected to the induction coil, and a high-frequency power (ICP power) is supplied to the induction coil so as to generate the ICP plasma. The conditions for the etching are as follows. The unit of sccm (i.e., standard cubic centimeters per minute) represents the flow rate at 25° C. under 1 atm, and the conditions are converted based on 1 sccm=1.69× $10^{-4}$ Pa·m³·sec⁻¹. As an etching gas, gas mixture containing $SF_6$ gas, $O_2$ gas, and Ar gas is used. The flow rates of the $SF_6$ gas, $O_2$ gas, and Ar gas are 84 sccm, 67 sccm, and 59 sccm, respectively. The temperature of the substrate is 30° C., the IC power is 700 W, the Bias power is 30 W, and the pressure in the vacuum chamber is 4.0 Pa (30 mTorr).

In the embodiment, an etching time is set to be about 37 minutes and 30 seconds. By this etching, the substrate 21 is etched so that a taper ratio of about 0.22 and a depth of about 150 µm are realized, thereby forming the first region Ha1. The diameter of a bottom portion of the first region Ha1 (diameter at the boundary surface K1) is about 600 µm.

Next, a second region Ha1 is formed by using a so-called Bosch technology. First, using $C_4F_8$ gas as a reactive gas, a protective layer is formed on a top surface and a side surface defining a through-hole. The protective layer is made of a polymer whose main component is polytetrafluoroethylene. The conditions for forming the protective layer are as follows. The flow rate of the $C_4F_8$ gas is 85 sccm. The temperature of the substrate is 10° C., the IC power is 600 W, and the pressure in the vacuum chamber is 2.27 Pa (17 mTorr). The reaction time for forming the protective layer is about 5 seconds. Then, using a gas mixture containing $SF_6$ gas and $O_2$ gas as an etching gas, the substrate 21 is etched. The conditions of this etching of the substrate 21 are as follows. When the flow rate of $SF_6$ gas is, for example, 130 sccm, the flow rate of the $O_2$ gas is set to be 13 sccm. The temperature of the substrate is 10° C., the ICP power is 600 W, and the Bias power is 20 W. The pressure in the vacuum chamber is 3.47 (Pa) (26 mTorr). The etching time is set to be about 6 seconds. The above-described step of forming a protective layer and the step of etching performed after the step of forming a protective layer are repeated for approximately 137 minutes. By the above-described steps, the substrate 21 is etched so that a taper ratio on the order of 0.02 and a depth on the order of 480 µm (total depth of the Ha2 is equal to 630 µm) are realized, thereby forming the second region Ha2.

In the steps of forming the first region Ha1 and the second region Ha2 of the recess Ha, the substrate 21 is isotropically etched by the RIE method using the ICP etching apparatus. Therefore, the circular opening pattern M1a of the resist mask M1 is precisely transferred to patterns of the first region Ha1 and the second region Ha2 of the recess Ha. The center of the recess Ha is maintained at the same position as the center of the circular opening pattern M1a of the resist mask M1. Therefore, a center axis Ha4 having a relatively high positional precision is provided.

Next, as shown in FIG. 10B, the resist mask M1 is removed. After removing the resist mask M1, the substrate (wafer) is separated into a plurality of optical semiconductor devices 1 by dicing. Then, a previously produced optical waveguide device 90 and the optical semiconductor device 1 produced as mentioned above are prepared (hereunder, referred to as a first step).

After the first step, in a second step, the optical semiconductor device 1 and the optical waveguide device 90 are aligned so that an optical waveguide 1a of the optical semiconductor device 1 is optically coupled with an optical waveguide 93a of the optical waveguide device 90, and so that an optical waveguide 1b of the optical semiconductor device 1 is optically coupled with an optical waveguide 93b of the optical waveguide device 90.

In the second step, the optical semiconductor device 1 and the optical waveguide device 90 are disposed so that a principal surface Sf1a and a back surface Sf2b face each other. The optical semiconductor device 1 and the optical waveguide device 90 are positioned so that each of the center axes Ha4 of the recesses Ha is roughly aligned with each of the center axes 91c1 of the through-holes 91c. In positioning between the optical semiconductor device 1 and the optical waveguide device 90, high precision for the positioning is not required. Next, guide pins TP are inserted into the through-holes 91c and the recesses Ha. This causes the optical semiconductor device 1 and the optical waveguide device 90 to be positioned, easily and accurately. When the guide pins TP are inserted into the through-holes 91c and the recesses Ha, each of the center axes Ha4 of the recesses Ha is accurately aligned with each of the center axes 91c1 of the through-holes 91c. In this case, each of the center axes TP1 of the guide pins is also aligned with each of the center axes Ha4 of the recesses Ha and each of the center axes 91c1 of the through-holes 91c. The optical semiconductor device 1 and the optical waveguide device 90 are aligned with high precision by using the guide pins TP.

Next, in a third step, the optical semiconductor device 1 and the optical waveguide device 90 that have been positioned with a relatively high precision in the second step are joined to each other. In the third step, the optical semiconductor device 1 and the optical waveguide device 90 are joined to each other using a fixing member such as resin or solder (corresponding to the joint 40) while the guide pins TP are inserted into the optical waveguide device 90 (in particular, the base 91) and the optical semiconductor device 1. The semiconductor device 1 and the optical waveguide device 90 are firmly fixed by the fixing member (joint 40). In addition, the optical waveguide 1a and the optical waveguide 1b of the optical semiconductor device 1 are precisely aligned with the optical waveguide 93a and the optical waveguide 93b of the optical waveguide device 90, respectively.

Second Example

With reference to FIG. 12, another method for producing the optical assembly 100 will be described below as a second example. FIG. 12 shows a main step of the method for producing the optical assembly 100 according to the embodiment, and a product as seen from a plane (z-x plane) that is the same as the plane from which FIG. 2 is seen.

As described above, in the second step of the first example, after positioning the optical semiconductor device 1 and the optical waveguide device 90 so as to roughly align the center axis Ha4 of the recess Ha and the center axis 91c1 of the through-hole 91c with each other, the guide pin TP is inserted into the through-hole 91c and the recess Ha. By inserting the guide pin TP into the through-hole 91c and the recess Ha, the center axis Ha4 of the recess Ha is accurately aligned with the center axis 91c1 of the through-hole 91c. As a result, the optical semiconductor device 1 and the optical waveguide device 90 are aligned with high precision by using the guide pin TP. In addition, the optical waveguide 1a and the optical waveguide 1b of the optical semiconductor device 1 are precisely aligned with the optical waveguide 93a and the optical waveguide 93b of the optical waveguide device 90, respectively. The optical waveguide 1a and the optical waveguide 1b of the optical semiconductor device 1 are optically coupled with the optical waveguide 93a and the optical waveguide 93b of the optical waveguide device 90, respectively.

In a second step of the second example, first, after the first step of forming the optical semiconductor device 1 and the optical waveguide device 90, the guide pins TP are inserted into the recesses Ha of the optical semiconductor device 1 as shown in FIG. 12. Thereafter, the optical waveguide device 90 is slid while the guide pins TP are fitted into the through-holes 91c of the optical waveguide device 90 so that the first principal surface and the second back surface face each other. The method for producing the optical assembly 100 other than the second step is substantially the same as that of the first example.

In the embodiment, first, the guide pins TP are inserted into the recesses Ha of the optical semiconductor device 1, after the first step of forming the optical semiconductor device 1 and the optical waveguide device 90. Each of the center axes TP1 of the guide pins is aligned with each of the center axes Ha4 of the recesses Ha. Thereafter, the optical waveguide device 90 is slid while the guide pins TP are fitted into the through-holes 91c of the optical waveguide device 90 so that the first principal surface and the second back surface face each other. Each of the center axes Ha4 of the recesses Ha is accurately aligned with each of the center axes 91c1 of the through-holes 91c. As a result, the optical semiconductor device 1 and the optical waveguide device 90 are positioned, easily and accurately. In the embodiment, the optical waveguide 1a and the optical waveguide 1b of the optical semiconductor device 1 are precisely aligned with the optical waveguide 93a and the optical waveguide 93b of the optical waveguide device 90, respectively. In addition, before inserting the guide pin into the through-hole and the recess, the step of positioning the optical semiconductor device and the optical waveguide device so as to roughly align the center axis of the recess and the center axis of the through-hole with each other may be omitted.

Although the principles of the present invention have been illustrated and described in a preferred embodiment, it is understood by those skilled in the art that changes may be made in the present invention in terms of arrangements and details without departing from such principles. The present invention is not limited to the particular structures disclosed in the embodiment. Therefore, the right to make any changes and modifications on the basis of the scope of the claims and the scope of the spirit of the claims may be demanded.

What is claimed is:

1. A method for producing an optical assembly, comprising the steps of:
    forming an optical semiconductor device having a first principal surface and a first back surface opposite to the first principal surface, the optical semiconductor device including a substrate, a recess formed in the first principal surface, and a first optical waveguide formed on the substrate, the recess having a first center axis substantially orthogonal to the first principal surface;
    forming an optical waveguide device having a second principal surface and a second back surface opposite to the second principal surface, the optical waveguide device including a through-hole having a second center axis substantially orthogonal to the second back surface; and a second optical waveguide, the through-hole penetrating through the second principal surface and the second back surface;
    positioning the optical semiconductor device and the optical waveguide device so that the first principal surface and the second back surface face each other;
    aligning the optical semiconductor device and the optical waveguide device by inserting a guide pin into the through-hole and the recess, the first center axis of the recess and the second center axis of the through-hole being aligned with each other; and
    joining the optical semiconductor device and the optical waveguide device to each other, wherein
    the recess extends from the first principal surface to an end portion in a middle portion of the substrate,
    the recess includes a first region and a second region arranged adjacent to the first region,
    the first region has an opening at the first principal surface and a taper portion having a diameter that increases from a boundary surface between the first region and the second region towards the first principal surface, the boundary surface being in the substrate,
    the second region has the end portion of the recess in the substrate and a taper portion having a diameter that decreases from the boundary surface towards the end portion in the substrate,
    the taper portion of the first region has a taper ratio greater than a taper ratio of the taper portion of the second region, and
    in the step of aligning the optical semiconductor device and the optical waveguide device, the first optical waveguide of the optical semiconductor device is optically coupled with the second optical waveguide of the optical waveguide device.

2. The method according to claim 1, wherein
    the guide pin includes an end portion that has an end surface and a taper portion having a diameter that decreases towards the end surface,
    the taper ratio of the taper portion of the first region is greater than a taper ratio of the taper portion of the end portion of the guide pin, and
    the taper ratio of the taper portion of the end portion of the guide pin is greater than the taper ratio of the taper portion of the second region.

3. The method according to claim 2,
    wherein, in the step of aligning the optical semiconductor device and the optical waveguide device by inserting the guide pin into the through-hole and the recess, the guide pin is in contact with the through-hole, and the end portion of the guide pin is in contact with the recess at the boundary surface.

4. The method for producing an optical assembly, comprising the steps of:
    forming an optical semiconductor device having a first principal surface and a first back surface opposite to the first principal surface, the optical semiconductor device including a substrate, a recess formed in the first principal surface, and first optical waveguide formed on the substrate, the recess having a first center axis substantially orthogonal to the first principle surface;
    forming an optical waveguide device having a second principal surface and a second back surface opposite to the second principal surface, the optical waveguide device including a through-hole having a second center axis substantially orthogonal to the second back surface, and a second optical waveguide, the through-hole penetrating through the second principal surface and the second back surface;
    positioning the optical semiconductor device and the optical waveguide device so that the first principal surface and the second back surface face each other;
    aligning the optical semiconductor device and the optical waveguide device by inserting a guide pin into the through-hole and the recess, the first center axis of the recess and the second center axis of the through-hole being aligned with each other; and
    joining the optical semiconductor device and the optical waveguide device to each other, wherein
    the recess extends from the first principal surface to a middle portion of the substrate,
    in the step of aligning the optical semiconductor device and the optical waveguide device, the first optical waveguide of the optical semiconductor device is optically coupled with the second optical waveguide of the optical waveguide device, the optical semiconductor device further includes an electric wiring structure formed on the substrate, the electric wiring structure includes an electric wiring section and a moisture-proof structure, the moisture-proof structure is formed between the electric wiring section and the recess so as to surround the recess, and the moisture-proof structure is embedded in an insulating film.

5. The method according to claim 4,
wherein the moisture-proof structure includes a metallic layer that is the same as that of the electric wiring section.

6. The method according to claim 1,
wherein the optical semiconductor device includes a plurality of the recesses,
the optical waveguide device includes a plurality of the through-holes, and
the optical semiconductor device and the optical waveguide device are aligned by inserting one of the guide pins into each of the through-holes and each of the recesses.

7. The method according to claim 1, wherein the optical semiconductor device and the optical waveguide device are joined to each other using resin or solder while the guide pin is inserted in the through-hole and the recess.

8. A method for producing an optical assembly, comprising the steps of:

forming an optical semiconductor device having a first principal surface and a first back surface opposite to the first principal surface, the optical semiconductor device including a substrate, a recess formed in the first principal surface, and a first optical waveguide formed on the substrate, the recess having a first center axis substantially orthogonal to the first principal surface;

forming an optical waveguide device having a second principal surface and a second back surface opposite to the second principal surface, the optical waveguide device including a through-hole having a second center axis substantially orthogonal to the second back surface, and a second optical waveguide, the through-hole penetrating through the second principal surface and the second back surface;

inserting a guide pin into the recess of the optical semiconductor device;

positioning the optical semiconductor device and the optical waveguide device so that the first principal surface and the second back surface face each other by sliding the optical waveguide device while the guide pin is fitted into the through-hole of the optical waveguide device, the first center axis of the recess and the second center axis of the through-hole being aligned with each other; and joining the optical semiconductor device and the optical waveguide device to each other, wherein the recess extends from the first principal surface to an end portion in a middle portion of the substrate, the recess includes a first region and a second region arranged adjacent to the first region, the first region has an opening at the first principal surface and a taper portion having a diameter that increases from a boundary surface between the first region and the second region towards the first principal surface, the boundary surface being in the substrate, the second region has the end portion of the recess in the substrate and a taper portion having a diameter that decreases from the boundary surface towards the end portion in the substrate, the taper portion of the first region has a taper ratio greater than a taper ratio of the taper portion of the second region, and in the step of positioning the optical semiconductor device and the optical waveguide device, the first optical waveguide of the optical semiconductor device is optically coupled with the second optical waveguide of the optical waveguide device.

9. The method according to claim 8, wherein
the guide pin includes an end portion having an end surface and a taper portion having a diameter that decreases towards the end surface,
the taper ratio of the taper portion of the first region is greater than a taper ratio of the taper portion of the end portion of the guide pin, and
the taper ratio of the taper portion of the end portion of the guide pin is greater than the taper ratio of the taper portion of the second region.

10. A method for producing an optical assembly, comprising the steps of:

forming an optical semiconductor device having a first principal surface and a first back surface opposite to the first principal surface, the optical semiconductor device including a substrate, a recess formed in the first principal surface, and a first optical waveguide formed on the substrate, the recess having a first center axis substantially orthogonal to the first principle surface;

forming an optical waveguide device having a second principal surface and a second back surface opposite to the second principal surface, the optical waveguide device including a through-hole having a second center axis substantially orthogonal to the second back surface, and a second optical waveguide, the through-hole penetrating through the second principal surface and the second back surface;

inserting a guide pin into the recess of the optical semiconductor device;

positioning the optical semiconductor device and optical waveguide device so that the first principal surface and the second back surface face each other by sliding the optical waveguide device while the guide pin is fitted into the through-hole of the optical waveguide device, the first center axis of the recess and the second center axis of the through-hole being aligned with each other; and joining the optical semiconductor device and the optical waveguide device to each other, wherein the recess extends from the first principal surface to the middle portion of the substrate, in the step of positioning the optical semiconductor device and the optical waveguide device, the first optical waveguide of the optical semiconductor device is optically coupled with the second optical waveguide of the optical waveguide device, the optical semiconductor device further includes an electric wiring structure formed on the substrate, the electric wiring structure includes an electric wiring section and a moisture-proof structure, the moisture-proof structure is formed between the electric wiring section and the recess so as to surround the recess and the moisture-proof structure is embedded in an insulating film.

11. The method according to claim 4, wherein
the optical semiconductor device includes a plurality of the recesses,
the optical waveguide device includes a plurality of the through-holes, and
the optical semiconductor device and the optical waveguide device are aligned by inserting one of the guide pins into each of the through-holes and each of the recesses.

12. The method according to claim 4, wherein the optical semiconductor device and the optical waveguide device are joined to each other using resin or solder while the guide pin is inserted in the through-hole and the recess.

* * * * *